(12) United States Patent
Sakai

(10) Patent No.: US 9,927,606 B1
(45) Date of Patent: Mar. 27, 2018

(54) ELETROWETTING DISPLAY DEVICE INCLUDING INTERNAL DIFFUSER

(71) Applicant: AMAZON TECHNOLOGIES, INC., Seattle, WA (US)

(72) Inventor: Toru Sakai, Waalre (NL)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/256,283

(22) Filed: Sep. 2, 2016

Related U.S. Application Data

(63) Continuation-in-part of application No. 14/972,733, filed on Dec. 17, 2015, now Pat. No. 9,678,330.

(51) Int. Cl.
*G02B 26/00* (2006.01)
*G02B 5/00* (2006.01)
*G02B 5/20* (2006.01)
*G02B 5/02* (2006.01)

(52) U.S. Cl.
CPC .......... *G02B 26/005* (2013.01); *G02B 5/003* (2013.01); *G02B 5/0236* (2013.01); *G02B 5/0278* (2013.01); *G02B 5/201* (2013.01)

(58) Field of Classification Search
USPC .................. 359/290–295; 345/107
See application file for complete search history.

(56) References Cited

U.S. PATENT DOCUMENTS

| | | | |
|---|---|---|---|
| 7,978,400 B2 * | 7/2011 | Takemoto ............... | G02B 3/14 359/316 |
| 2009/0127123 A1 * | 5/2009 | Raccurt .................... | G02B 3/14 205/334 |
| 2012/0105934 A1 * | 5/2012 | Kuo ....................... | G02B 26/005 359/290 |
| 2014/0185129 A1 * | 7/2014 | Kim ...................... | H01L 51/5284 359/296 |

* cited by examiner

Primary Examiner — Mohammed Hasan
(74) Attorney, Agent, or Firm — Brinks Gilson & Lione

(57) ABSTRACT

A display device includes a first support plate and a second support plate. The second support plate has a first refractive index. A pixel region is positioned between the first support plate and the second support plate. A first liquid and a second liquid that is immiscible with the first liquid are disposed in the pixel region. A diffusion layer disposed between the first support plate and the second support plate contacts the second liquid. The diffusion layer includes a first region providing a common electrode associated with the pixel region.

18 Claims, 9 Drawing Sheets

ELECTROWETTING DISPLAY DEVICE INCLUDING INTERNAL DIFFUSER

BACKGROUND

Electronic displays are found in numerous types of electronic devices including, without limitation, electronic book ("eBook") readers, mobile phones, laptop computers, desktop computers, televisions, appliances, automotive electronics, and augmented reality devices. Electronic displays may present various types of information, such as user interfaces, device operational status, digital content items, and the like, depending on the type and the purpose of the associated electronic device. The appearance and the quality of a display may affect a user's experience with the electronic device and the content presented thereon. Accordingly, enhancing user experience and satisfaction continues to be a priority.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
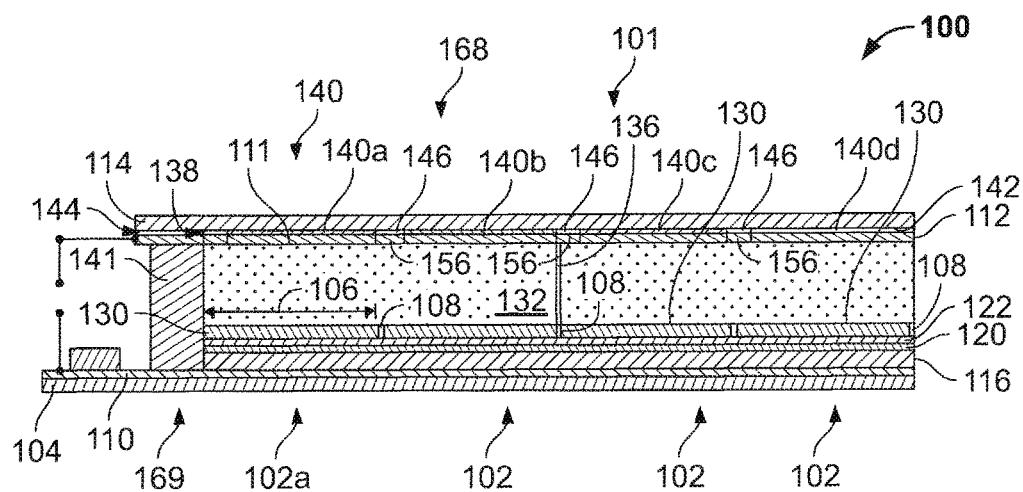
FIG. 1 is a cross-sectional view of the example electrowetting display device of FIG. 3 along sectional line 1-1, according to one embodiment.

In embodiments described herein, an electrowetting display device includes an electrically conductive layer, e.g., a patterned indium tin oxide (ITO) layer, referred to herein as a diffusion layer, disposed on or over, e.g., applied or deposited on or over, a surface of a support plate, such as an inner surface of a top support plate of the electrowetting display device to provide a diffusing effect on light entering and exiting a pixel region of the electrowetting display device. In example embodiments, the diffusion layer has a refractive index greater than a refractive index of the support plate. A layer of light-blocking material, e.g., a light-absorbing black matrix photoresist material, is disposed on, e.g., applied or deposited on or over, the inner surface of the support plate. The layer of black matrix material is patterned to form black matrix members aligned over corresponding pixel wall portions forming a perimeter of an active portion of associated pixel regions between the top support plate and an opposing bottom support plate. In example embodiments, the diffusion layer includes an electrically conductive, patterned indium tin oxide (ITO) material forming a first region including a plurality of ITO members. Each ITO member is disposed on or over a corresponding black matrix member. In example embodiments, the ITO members are arranged, for example, in parallel lines or in a grid, to form a continuous common electrode for the associated pixel regions. The ITO members are arranged to form or define an area in which a second region of the patterned ITO material is disposed. In example embodiments, the second region includes a plurality of features, e.g., islands, having randomized dimensions and/or shapes and/or randomly positioned within the second region. In example embodiments, the ITO features, are disposed on or over the inner surface of the top support plate and separated by a suitable distance from adjacent features to optimize the diffusion effect of the diffusion layer and separated by a suitable distance from the first region to electrically isolate the ITO features from the common electrode. The diffusion layer has a refractive index greater than a refractive index of the top support plate and a refractive index of the electrolyte liquid contained within the pixel region. In the example embodiments, the diffusion layer has a refractive index greater than 1.8, for example, 2.0, the top support plate has a refractive index of 1.5, and the electrolyte liquid has a refractive index of 1.45. In example embodiments, a difference in the refractive index of the diffusion layer and the diffractive index of the top support plate and the electrolyte solution is at least 0.2 and, more particularly, at least 0.3. In certain embodiments, a degree of light diffusion, a direction of light diffusion, and/or a transmittance of an internal diffusion layer can be controlled by tuning one or more parameters of the electrowetting display device.

In embodiments described herein, an electrowetting display device includes a reflective layer positioned under or at least partially within a pixel grid having a plurality of electrowetting pixel regions. Each electrowetting pixel region is formed by one or more respective pixel wall portions forming a perimeter of an active portion, e.g., a display surface area, of the electrowetting pixel region. The electrowetting pixel regions may have one or more specific and/or additional structural features. The reflective layer is positioned with respect to, e.g., within or under, each electrowetting pixel region. In certain embodiments, the reflective layer may include one or more specular reflectors and/or one or more diffuse reflectors positioned with respect to, e.g., within or under, each electrowetting pixel region. In certain embodiments, the reflective layer includes one or more specular reflectors made of a suitable material including, without limitation, a suitable metal, alloy, doped metal, or dielectric reflective material. In certain embodiments, the reflective layer includes one or more diffuse reflectors made of a suitable diffuse reflective material, such as titanium dioxide ($TiO_2$), for example.

During operation of the electrowetting display device, light enters the electrowetting display device through a top support plate as a voltage source applies a voltage over the electrode layers, i.e., a first or pixel electrode and the common electrode to cause displacement of a fluid, such as a first fluid, contained within one or more electrowetting pixel regions. After entering the electrowetting display device through the top support plate, light travels through the diffusion layer forming the common electrode and is diffused. The diffused light continues to travel through the electrowetting pixel region into the active portion of the electrowetting pixel region and impinges on the reflective layer positioned at or near a bottom of the electrowetting pixel region. The light is reflected by the reflective layer and then travels out of the electrowetting display device through the top support plate. As described in greater detail below, a position, a configuration and/or one or more dimensions of each feature formed in the diffusion layer may be selected to optimize a performance of the electrowetting display device by adjusting one or more parameters or characteristics of the diffusion layer to provide a more paper-like appearance while maintaining a desired brightness level provided by the specular reflectance.

In general, the term "specular reflection" or "specular reflectance" refers to a mirror-like reflection of light from a surface in which light from a single incoming angle or direction (an incident ray) is reflected in a single outgoing angle or direction. In general, the term "diffuse reflection" or "diffuse reflectance" refers to the reflection of light from a surface in which an incident ray is reflected at more than one angle or direction, e.g., many angles or directions, rather than at only one angle or direction as in the case of specular reflection. In general, the term "refraction" refers to a change in direction of propagation of a light ray due to a change in its transmission medium. Due to change of medium, the phase velocity of the light ray is changed but its frequency remains constant. This is most commonly observed when a light ray passes from one medium to another medium at any angle other than 0° from the normal. For example, refraction of light occurs at the interface between the two media of different refractive indices, with $n_2 > n_1$. Because the phase velocity is lower in the second medium ($v_2 < v_1$), the angle of refraction $\theta_2$ is less than the angle of incidence $\theta_1$; that is, the ray in the higher-index medium is closer to the normal. In optics, refraction is a phenomenon that often occurs when light rays travel at an oblique angle from a medium with a first refractive index to a medium with a second refractive index different from the first refractive index, e.g., greater than the first refractive index. At the boundary between the media, the phase velocity of the light ray is altered, usually causing a change in direction.

In various embodiments described herein, electronic devices include electrowetting displays for presenting content. In some examples, the electronic devices may include one or more components associated with the electrowetting display, such as a touch sensor component layered atop the electrowetting display for detecting touch inputs, a front light and/or a back light component for lighting the electrowetting display, and/or a cover layer component, which may include anti-glare properties, anti-reflective properties, anti-fingerprint properties, and/or anti-cracking properties, for example.

An electrowetting pixel region is defined by one or more pixel wall portions that surround or are otherwise associated with at least a portion of the electrowetting pixel region. The pixel wall portions form a structure that is configured to contain at least a portion of a first fluid, e.g., a first liquid such as an opaque oil. Light transmission through the electrowetting pixel region is controlled by the application of an electric potential to the electrowetting pixel region, which results in a movement of a second fluid, e.g., a second liquid such as a liquid electrolyte solution, into the electrowetting pixel region, thereby displacing the first fluid.

When the electrowetting pixel region is in an off state (i.e., with no electric potential applied), the first liquid, e.g., the opaque oil, is distributed throughout the electrowetting pixel region to substantially cover the active portion, e.g., the display surface area of the electrowetting pixel region. The first liquid absorbs light and the electrowetting pixel region in this condition appears black in one embodiment. But when the electric potential is applied, the electrowetting pixel region is in an on state and the first liquid is displaced to one or more sides of the electrowetting pixel region, for example. Light can then enter the electrowetting pixel region and impinge upon a surface of the reflective layer positioned at or near a bottom surface of the electrowetting pixel region. The light is then reflected by the reflective layer and reflects out of the electrowetting pixel region through the top support plate, causing the electrowetting pixel region to appear bright, e.g., white, to an observer. If the one or more reflective surfaces reflect only a portion of the light spectrum or if color filters are incorporated into the electrowetting pixel region structure, the electrowetting pixel region may appear to have color.

A display device, such as an electrowetting display device, may include a transmissive, reflective or transflective display that generally includes an array of pixel regions (e.g., which may comprise sub-pixels) configured to be operated by an active matrix addressing scheme. For example, rows and columns of electrowetting pixel regions are operated by controlling voltage levels on a plurality of source lines and gate lines. In this fashion, the display device may produce an image by selecting particular pixel regions to transmit, reflect or block light. Pixel regions are addressed (e.g., selected) via rows and columns of the source lines and the gate lines that are electrically connected to transistors (e.g., used as switches) included in each pixel region. Transistors occupy a relatively small fraction of the area of each pixel region to allow light to efficiently pass through (or reflect from) the pixel region. In example embodiments, a pixel region includes a pixel, a pixel including a plurality of sub-pixels, such as two sub-pixels, or one sub-pixel of an electrowetting display device. In certain embodiments, the pixel region includes two or more sub-pixels of an electrowetting display device. Such a pixel or sub-pixel may be the smallest light transmissive, reflective or transflective pixel region of a display that is individually operable to directly control an amount of light transmission through or reflection from the pixel region. For example, in some embodiments, a pixel region may include a red sub-pixel, a green sub-pixel, a blue sub-pixel, or a white sub-pixel for RGBW displays. In other embodiments, a pixel may be a smallest component, e.g., the pixel does not include any sub-pixels.

The array of pixel regions is sandwiched between two support plates, such as a bottom support plate and an opposing top support plate. For example, a bottom support plate in cooperation with a top support plate may contain pixel regions that include an electrowetting oil, a liquid electrolyte solution and pixel wall portions between the support plates. The support plates may be made of any suitable material including, without limitation, glass, plastic, or other transparent materials, and may be made of a rigid material or a flexible material, for example. Pixel regions include various layers of materials built upon the bottom support plate. One example layer is an amorphous fluoropolymer (AF1600®) with hydrophobic behavior. The pixel wall portions may be formed on a top surface of the hydrophobic layer, or, alternatively, may be formed before the hydrophobic layer is deposited over the bottom support plate, for example. The bottom support plate may be opaque while the top support plate is transparent. Describing a pixel region or material as being "transparent" generally means that the pixel region or the material may transmit a relatively large fraction of the light incident upon it. For example, a transparent material or a layer might transmit more than 70% or 80% of the light impinging on its surface, although in other examples a transparent material or structure might transmit a different percentage of incident light. In general, transparent materials or structures need not be perfectly transparent.

Hereinafter, example embodiments include, but are not limited to, reflective electrowetting displays having a clear or transparent top support plate and a bottom support plate, which need not be transparent. In general, "top" and "bottom" may be used to identify opposing support plates of an electrowetting display and do not necessarily refer to a direction referenced to gravity or to a viewing side of the electrowetting display device. In example embodiments, the top support plate is the surface through which pixel regions of a (reflective) electrowetting display are viewed.

As described above, individual reflective electrowetting pixel regions may include an electrode layer containing the drive electronics like TFT structures, source lines, and gate lines on the bottom support plate, a reflective layer on or over the electrode layer, a pixel electrode on the reflective layer, a barrier layer on the reflective layer, and a hydrophobic layer on the barrier layer. The reflective layer itself can act both as the pixel electrode and the reflective layer or an additional pixel electrode, e.g., an ITO layer, can be deposited on the reflective layer. The pixel electrode in principle is close to the fluids in the pixel region to minimize power consumption. In one embodiment, the pixel electrode is deposited over the reflective layer. In an alternative embodiment, the pixel electrode is under the reflective layer. In a further alternative embodiment, the pixel electrode is the reflective layer. The electrode layer as shown, for example, in FIGS. 1, 2, 4, and 5 can be an electrode layer containing the drive electronics if the reflective layer is used as the electrode or the electrode layer can contain the pixel electrodes in contact with the reflective layer. In example embodiments, the electrode layer may include more than one layer. Pixel wall portions of each pixel region, the hydrophobic layer, and the transparent top support plate at least partially enclose a fluid region within the cavity that includes the first fluid, e.g., the first liquid, which is electrically non-conductive, e.g., an opaque oil, retained in the individual electrowetting pixel regions by pixel wall portions, and the second fluid, e.g., the second liquid such as a liquid electrolyte solution, that is electrically conductive or polar and may be a water or a salt solution, such as a solution of potassium chloride in water. The second fluid may be transparent or light-absorbing. The second fluid is immiscible with the first fluid. In general, substances are immiscible with one another if the substances do not substantially form a solution, although in a particular embodiment the second fluid might not be perfectly immiscible with the first fluid. In general, an "opaque" fluid is a fluid that appears black to an observer. For example, an opaque fluid strongly absorbs a broad spectrum of wavelengths (e.g., including those of red, green and blue light) in the visible region of electromagnetic radiation appearing black. However, in certain embodiments, an opaque fluid may absorb a relatively narrower spectrum of wavelengths in the visible region of electromagnetic radiation and may not appear perfectly black. In example embodiments, each of the first fluid and the second fluid is a liquid.

In some embodiments, the opaque fluid is a nonpolar electrowetting oil. In certain embodiments, the first fluid may absorb at least a portion of the visible light spectrum. The first fluid may be transmissive for a portion of the visible light spectrum, forming a color filter. For this purpose, the first fluid may be colored by addition of pigment particles or a dye. Alternatively, the first fluid may be black, for example by absorbing substantially all portions of the visible light spectrum, or reflecting. A reflective first fluid may reflect the entire visible light spectrum, making the layer appear white, or a portion of the entire visible light spectrum, making the layer have a color. In example embodiments, the first fluid is black and, therefore, absorbs substantially all portions of an optical light spectrum.

Spacers and edge seals mechanically connect the first support plate with the overlying, opposing second support plate, or form a separation between the first support plate and the second support plate, to contribute to the mechanical integrity of the electrowetting display device. Edge seals, for example, disposed along a periphery of an array of electrowetting pixel regions, may contribute to retaining fluids (e.g., the first liquid and the second liquid) between the first support plate and the overlying second support plate.

In some embodiments, the electrowetting display device as described herein may be incorporated into a system that includes one or more processors and one or more computer memories, which may reside on a control board, for example. Display software may be stored on the one or more memories and may be operable with the one or more processors to modulate light that is received from an outside source (e.g., ambient room light) or out-coupled from a lightguide of the electrowetting display device. For example, display software may include code executable by a processor to modulate optical properties of individual pixel regions of the electrowetting display device based, at least in part, on electronic signals representative of a static image and/or video data. The code may cause the processor to modulate the optical properties of pixel regions by controlling electrical signals (e.g., voltages, currents, and fields) on, over, and/or in layers of the electrowetting display device.

Figure 2:
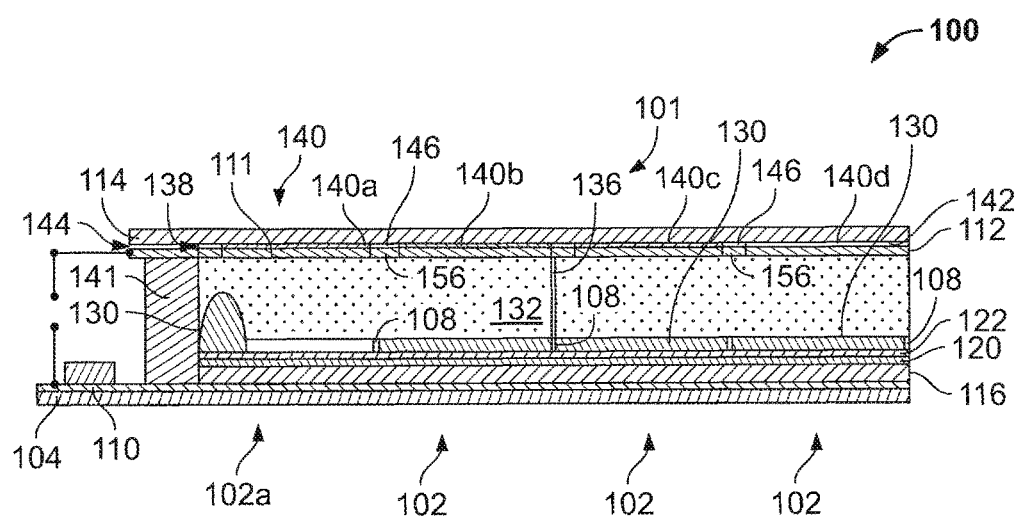
FIG. 2 is a cross-sectional view of the electrowetting display device of FIG. 3 along sectional line 1-1 with a first pixel region activated to expose at least a portion of a display area including a reflective layer.
Figure 3:
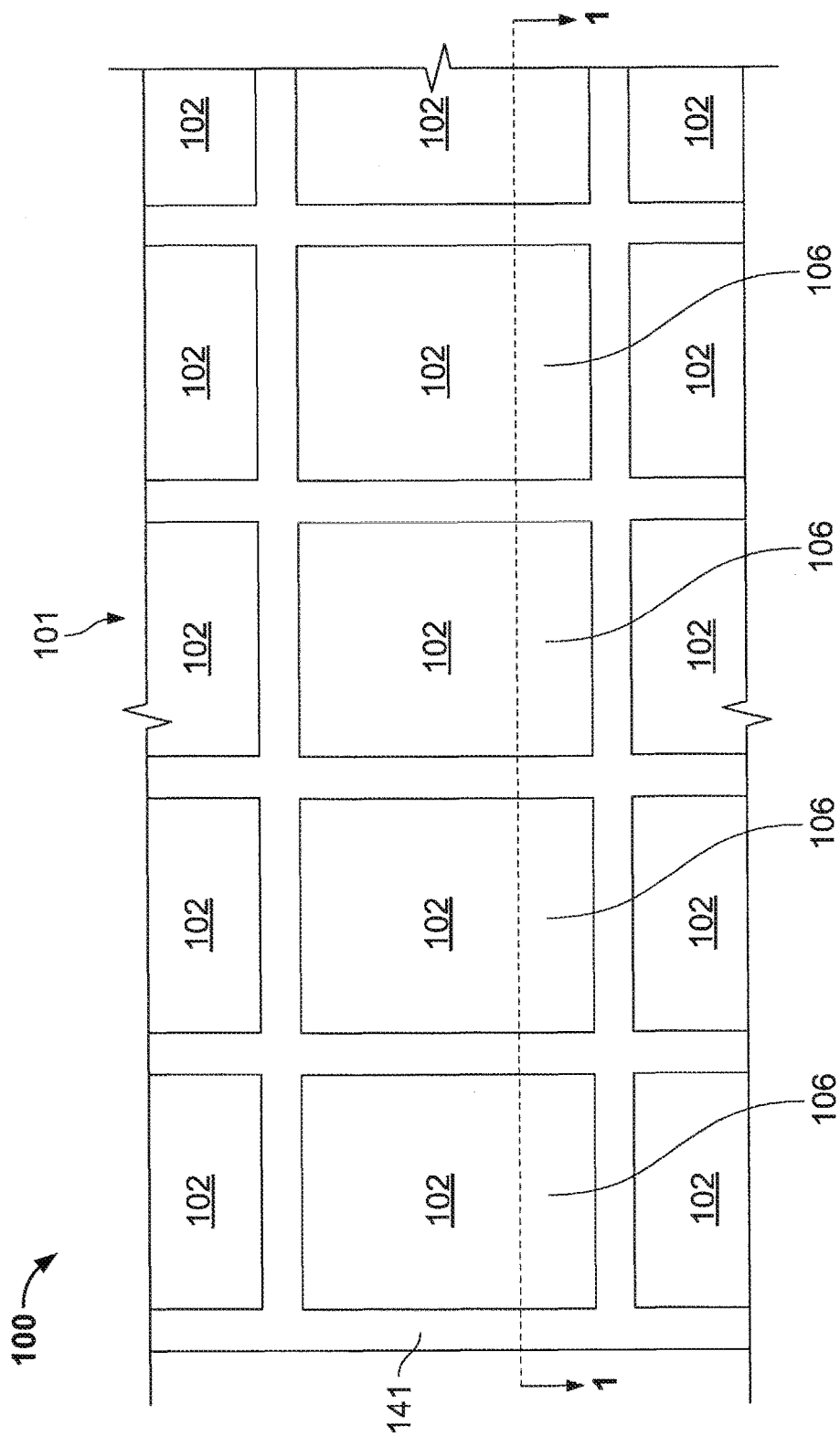
FIG. 3 is a top view of a plurality of electrowetting pixel regions of an example electrowetting display device.

Referring now to the figures, FIG. 1 is a cross-sectional view of a portion of an example reflective electrowetting display device 100 including a grid 101 with several electrowetting pixel regions 102 taken along a sectional line 1-1 of FIG. 3. FIG. 2 shows the same cross-sectional view as FIG. 1 in which an electric potential has been applied to one electrowetting pixel region 102a causing displacement of a first fluid disposed therein, as described below. Four complete electrowetting pixel regions 102 are shown in cross-section in FIGS. 1 and 2. FIG. 3 is a top view of example reflective electrowetting display device 100 including grid 101 having a plurality of electrowetting pixel regions 102 formed over a first or bottom support plate 104 (shown in FIGS. 1 and 2). As shown in FIG. 3, each electrowetting pixel region 102 includes an active portion, e.g., a display surface area 106. More specifically, in this embodiment, display surface area 106 is defined by pixel wall portions 108, as described below, having a first dimension, such as a width, between opposing lateral pixel wall portions 108, and a second dimension, such as a length, between the remaining opposing pixel wall portions 108. Electrowetting display device 100 may include any number (usually a very large number, such as thousands or millions) of electrowetting pixel regions 102.

Referring further to FIGS. 1 and 2, an electrode layer 110 having a plurality of pixel electrodes is formed on bottom support plate 104, for example, between electrowetting pixel regions 102 and bottom support plate 104. Electrode layer 110 and/or the one or more pixel electrodes are operatively coupled to an electrically conductive layer, e.g., a diffusion layer 111, forming a second or common electrode 112 positioned under a second or top support plate 114 for creating, in conjunction with common electrode 112, a voltage differential between electrode layer 110 and common electrode 112 to cause relative displacement of a first liquid, e.g., an oil, and a second liquid, e.g., an electrolyte liquid, within the electrowetting pixel region. These example embodiments are not limiting with respect to the location of the first and second electrode, and claimed subject matter is not limited in this respect. In particular embodiments, one or more additional layers may be positioned between electrode layer 110 and bottom support plate 104, in which TFT structures, gates, and/or source lines are located, for example. In these embodiments, electrode layer 110 may not be formed directly on bottom support plate 104. In various embodiments, electrode layer 110 may be connected to any number of transistors, such as suitable thin film transistor (TFT) structures (not shown), that are switched to either select or deselect corresponding electrowetting pixel regions 102 using active matrix addressing, for example. A TFT structure is a particular type of field-effect transistor that includes thin films of an active semiconductor layer as well as a dielectric layer and metallic contacts over a supporting (but non-conducting) substrate, which may be glass or any suitable transparent or non-transparent material, for example.

A reflective layer 116 is positioned adjacent, e.g., on or over electrode layer 110, as shown in FIGS. 1 and 2, for example. In particular embodiments, one or more additional layers may be positioned between reflective layer 116 and electrode layer 110. In these embodiments, reflective layer 116 may not be formed directly on electrode layer 110. In an alternative embodiment, reflective layer 116 is positioned under a transparent electrode layer. In this alternative embodiment, reflective layer 116 is positioned between the transparent electrode layer 110 and bottom support plate 104. Reflective layer 116 may reflect light within the entire visible spectrum, making the layer appear relatively bright, or reflect a portion of light within the visible spectrum, making the layer have a color. In this embodiment, reflective layer 116 is positioned within the pixel region, e.g., within each electrowetting pixel region 102, to provide specular reflection.

As shown in FIGS. 1 and 2, in the example embodiment, reflective layer 116 is positioned on electrode layer 110 and in electrowetting pixel region 102. In alternative embodiments, reflective layer 116 is position on electrode layer 110 and under electrowetting pixel region 102. In certain embodiments, reflective layer 116 includes one or more suitable materials such as, for example, a metal (90%, 95% or greater than 95% metal), an alloy, a doped metal, and/or a dielectric reflective material. Suitable metal materials for reflective layer 116 include, without limitation, aluminum, silver, gold, copper, nickel, platinum, rhodium, lanthanum, and/or silicon nickel. Suitable alloy materials for reflective layer 116 include, without limitation, aluminum with copper or aluminum with nickel. In further alternative embodiments, reflective layer 116 is made of any suitable material providing a desired specular reflectance. In alternative embodiments, reflective layer includes a suitable diffuse reflective material deposited on or over electrode layer 110. In this alternative embodiment, any suitable diffuse reflective material, such as titanium dioxide ($TiO_2$), providing a desired diffuse reflectance may be used.

Electrowetting pixel regions 102 may have specific and/or additional structural features. Additionally or alternatively, reflective layer 116 may have structural features, for example, one or more relatively thinner areas and/or one or more relatively thicker areas within reflective layer 116 to control movement of the fluids. Alternatively, reflective layer 116 may be deposited on a structural feature conforming to a shape of the structural feature.

A suitable dielectric barrier layer 120 may at least partially separate electrode layer 110 from a hydrophobic layer 122, such as an amorphous fluoropolymer layer forming a bottom surface of electrowetting pixel region 102. For example, dielectric barrier layer 120 in certain embodiments is deposited on reflective layer 116. Dielectric barrier layer 120 may be formed from various materials including one or more organic material layers or a combination of organic and inorganic material layers. A thickness of the insulating dielectric barrier layer 120 may be less than 2 micrometers and may be less than 1 micrometer; for example, the insulating dielectric barrier layer 120 may be 100 nanometers to 800 nanometers in thickness in certain embodiments. In some embodiments, hydrophobic layer 122 is an amorphous fluoropolymer layer including any suitable fluoropolymer(s), such as AF1600®, produced by DuPont, based in Wilmington, Del. Hydrophobic layer 122 is transparent in the example embodiment. Reflective layer 116 below hydrophobic layer 122 may reflect light within the entire visible spectrum, making the layer appear white, or reflect a portion of light within the visible spectrum, making the layer have a color. As described above, in certain embodiments, reflective layer 116 itself can act both as a pixel electrode and a reflective layer.

In the example embodiment, a plurality of pixel wall portions 108 form patterned grid 101 on hydrophobic layer 122. Pixel wall portions 108 may include a photoresist material such as, for example, epoxy-based negative photoresist SU-8. Patterned grid 101 includes a plurality of rows and a plurality of columns of coupled pixel wall portions 108 that form an array of electrowetting pixel regions, such as shown in FIG. 3, including a plurality of electrowetting pixel regions 102 that may have a width and a length in a range of about 50 to 500 micrometers, for example.

A first fluid 130, which may have a thickness (e.g., a height as shown in FIGS. 1 and 2, for example) in a range of about 1 micrometer to 10 micrometers, for example, overlays hydrophobic layer 122. First fluid 130 is partitioned by pixel wall portions 108 of patterned grid 101. A second fluid 132, such as a liquid electrolyte solution, overlays first fluid 130 and pixel wall portions 108 of patterned grid 101. In certain embodiments, as described above, second fluid 132 may be electrically conductive and/or polar. For example, second fluid 132 may be water or a water solution, or a salt solution such as a solution of potassium chloride in water or a mixture of water and ethyl alcohol. In certain embodiments, second fluid 132 is transparent, but may be colored or absorbing. First fluid 130 is electrically nonconductive and may, for example, be an alkane like hexadecane or (silicone) oil. As described above, first fluid 130 is immiscible with second fluid 132.

As described above, hydrophobic layer 122 is arranged on bottom support plate 104 to create an electrowetting surface area. The hydrophobic character of hydrophobic layer 122 causes first fluid 130 to adjoin preferentially to hydrophobic layer 122 because first fluid 130 has a higher wettability with respect to a top surface of hydrophobic layer 122 than second fluid 132 in the absence of a voltage. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the fluid tends to form a film on the surface of the solid.

Top support plate 114 covers second fluid 132 and one or more spacers 136 to maintain second fluid 132 over grid 101. In one embodiment, spacer 136 extends from top support plate 114 and may rest upon a top surface of one or more pixel wall portions 108. In alternative embodiments, spacer 136 does not rest on pixel wall portion 108 but is substantially aligned with pixel wall portion 108. This arrangement may allow spacer 136 to come into contact with pixel wall portion 108 upon a sufficient pressure or force being applied to top support plate 114. Multiple spacers 136 may be interspersed throughout grid 101. In example embodiments, one or more color filter layers 138 including, for example, one or more color filter portions 140, such as a red color filter portion 140a, a green color filter portion 140b, a blue color filter portion 140c, and a transparent (white) color filter portion 140d as shown in FIGS. 1 and 2, may be positioned between diffusion layer 111 and top support plate 114. A seal 141 extends about a perimeter of electrowetting display device 100 to contain first fluid 130 and second fluid 132 within the fluid region of the cavity. A voltage applied across, among other things, second fluid 132 and electrode layer 110 of individual electrowetting pixel regions 102 may control transmittance or reflectance of the individual electrowetting pixel regions 102.

Figure 4:
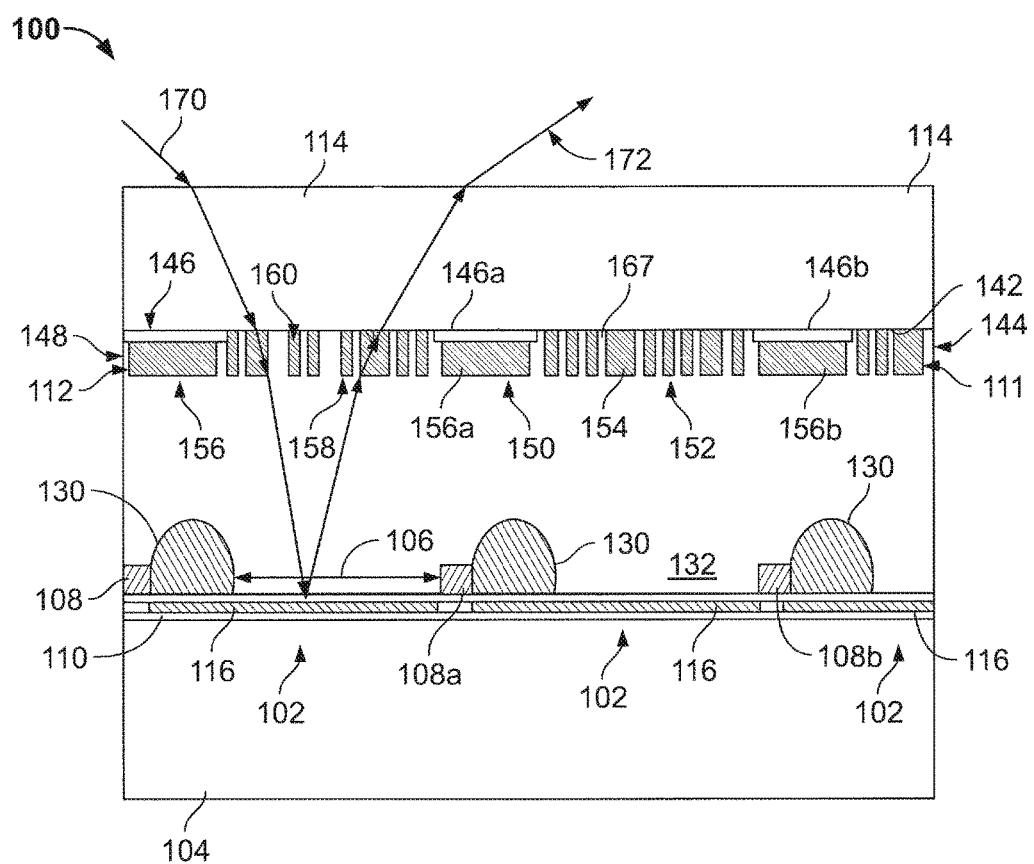
FIG. 4 is a partial cross-sectional view of an example electrowetting display device, according to an example embodiment.
Figure 5:
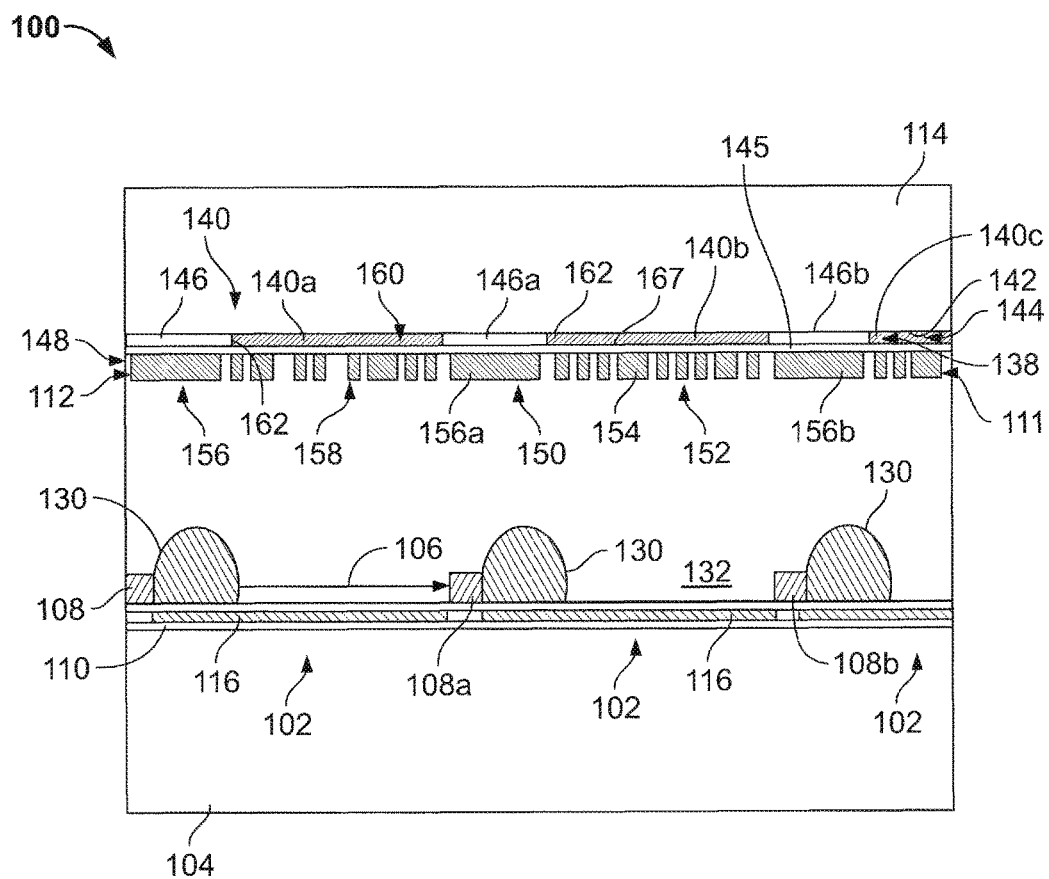
FIG. 5 is a partial cross-sectional view of an example electrowetting display device, according to an alternative example embodiment.
Figure 6:
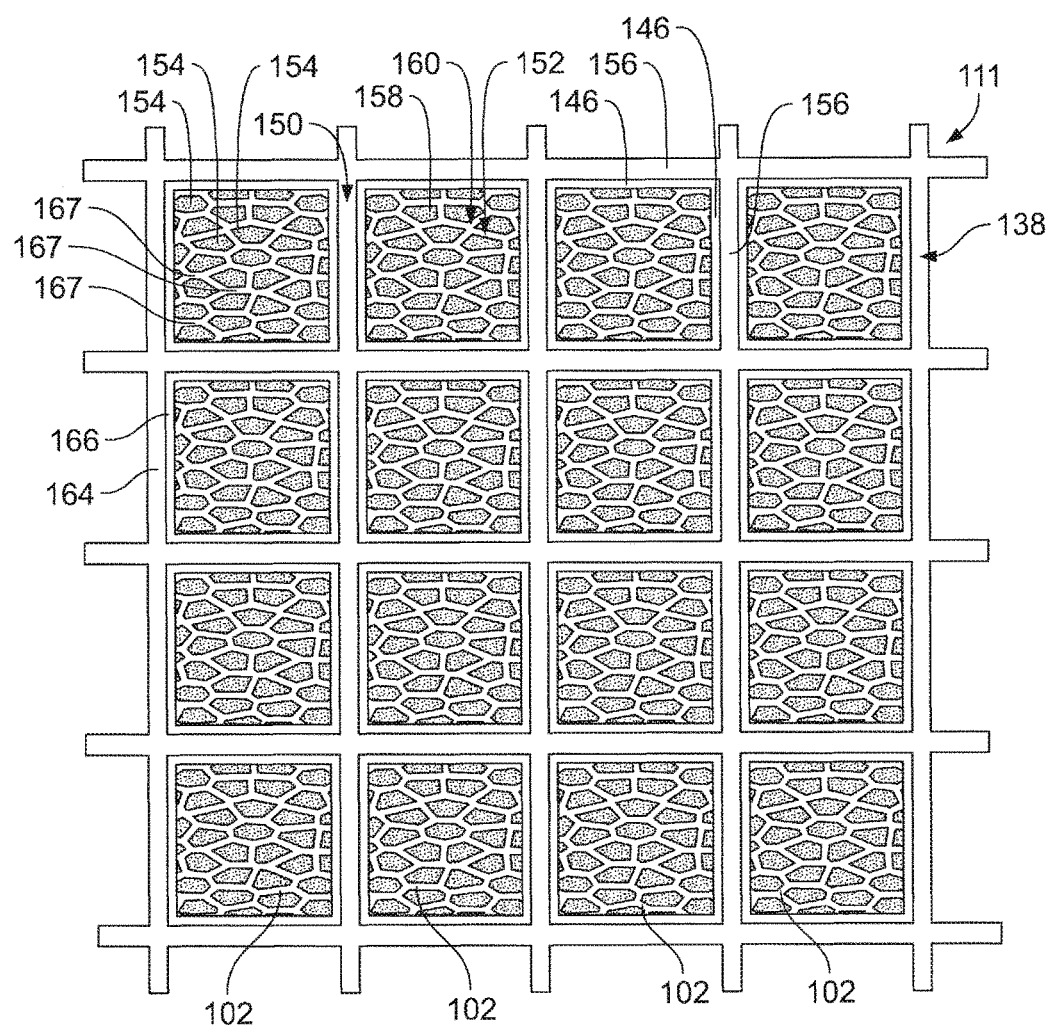
FIG. 6 is a plan view of an example diffusion layer disposed on an inner surface of a support plate of an electrowetting display device, according to an example embodiment.

Referring to FIGS. 4-6, in certain example embodiments, color filter layer 138 is disposed on, e.g., formed or deposited on, a first or inner surface 142 of top support plate 114 in the electrowetting pixel region. More specifically, a first surface of color filter layer 138 contacts inner surface 142 of top support plate 114 and a second surface of color filter layer 138, opposite the first surface, contacts a first surface of diffusion layer 111. A light-blocking layer 144, as described below, is also disposed on, e.g., formed or deposited on, on inner surface 142 of top support plate 114 and coplanar with color filter layer 138.

Diffusion layer 111 is formed on or over color filter layer 138 and/or coplanar light-blocking layer 144 to provide additional diffusion of light entering and exiting electrowetting display device 100 as desired. In a particular embodiment, as shown in FIG. 5, for example, a planarization layer 145, such as a suitable transparent organic material layer, is disposed on, e.g., deposited or formed on, color filter layer 138 and/or coplanar light-blocking layer 144 before diffusion layer 111 is formed over color filter layer 138 and/or light-blocking layer 144. More specifically, diffusion layer 111 is disposed on, e.g., formed or deposited on, color filter layer 138 and/or inner surface 142 of top support plate 114 and coplanar light-blocking layer 144. In certain example embodiments, diffusion layer 111 is a layer of electrically conductive indium tin oxide (ITO) material; however, in other embodiments, diffusion layer 111 may include any suitable electrically conductive, diffusion material.

Referring further to FIGS. 4-6, in example embodiments, electrowetting display device 100 includes first or bottom support plate 104 and second or top support plate 114 opposing bottom support plate 104. Top support plate 114 has a first refractive index of 1.5, for example. Electrowetting pixel region 102 between bottom support plate 104 and top support plate 114 includes a plurality of pixel wall portions 108 over bottom support plate 104 forming a perimeter of an active portion of electrowetting pixel region 102, e.g., display surface area 106. In example embodiments, reflective layer 116 is disposed over bottom support plate 104 in electrowetting pixel region 102. First fluid 130, e.g., a first liquid such as a suitable electrowetting oil, and second fluid 132, e.g., a second liquid such as a suitable liquid electrolyte solution, that is immiscible with first fluid 130, are disposed in electrowetting pixel region 102. Color filter layer 138 and light-blocking layer 144 are disposed on inner surface 142 of top support plate 114. In example embodiments, such as shown in FIGS. 4 and 5, light-blocking layer 144 includes a plurality of light-blocking portions 146 disposed on top support plate 114, e.g., disposed on inner surface 142. In a particular embodiment, light-blocking portions 144 include a suitable light-absorbing material, such as a black matrix material. As shown in FIGS. 4 and 5, a first light-blocking portion 146a of the plurality of light-blocking portions 146 is positioned over, e.g., aligned with, a first pixel wall portion 108a of the plurality of pixel wall portions 108.

Diffusion layer 111, e.g., an indium tin oxide (ITO) layer 148, is disposed on color filter layer 138. In example embodiments, ITO layer 148 includes a first region 150 disposed on, formed or deposited on, at least a portion of one or more light-blocking portions 146 of light-blocking layer 144. For example, first region 150 may be formed of a plurality of members arranged in a plurality of parallel lines, e.g., parallel horizontal lines and/or parallel vertical lines. In a particular embodiment, the plurality of members in first region 150 forms a grid. First region 150 forms at least a portion of common electrode 112 associated with each electrowetting pixel region 102 and contacting second fluid 132, e.g., a liquid electrolyte solution. Diffusion layer 111 also includes a second region 152 over the active portion of electrowetting pixel region 102, e.g., display surface area 106. In example embodiments as shown in FIGS. 4-6, for example, second region 152 includes a plurality of features 154 configured to diffuse light propagating through ITO layer 148 into the active portion of electrowetting pixel region 102. Diffusion layer 111, and, more specifically, each feature 154 in second region 152, has a second refractive index greater than the first refractive index. In example embodiments, the first refractive index, i.e., the refractive index of top support plate 114, is 1.5 and the second refractive index, i.e., the refractive index of features 154, is greater than 1.8, for example, 2.0. Moreover, the first refractive index is greater than a third refractive index, i.e., a refractive index of the electrolyte solution, of 1.45. As shown in FIGS. 4-6, each feature 154 is separated by a distance from an adjacent feature 154 to optimize the diffusion effect of diffusion layer 111. Each feature 154 is also separated by a suitable distance from first region 150 to electrically isolate feature 154 from common electrode 112. In example embodiments, second region 152 includes a layer of indium tin oxide material having a thickness of 100 nanometers to 300 nanometers and a second refractive index greater than 1.8, for example, 2.0.

In example embodiments, first region 150 includes a plurality of members 156 arranged, for example, in a plurality of parallel lines including one or more members 156 or in a grid, to form common electrode 112. In these embodiments, members 156 at least partially form a perimeter of a first area 158 in which second region 152 is disposed. For example, in certain embodiments, pixel region 102 includes a plurality of pixel wall portions 108 forming a perimeter of pixel region 102 and first region 150 includes a first member 156a positioned over first pixel wall portion 108a of the plurality of pixel wall portions 108 and a second member 156b is positioned over a second pixel wall portion 108b of the plurality of pixel wall portions 108 opposite first pixel wall portion 108a. In this embodiment, the plurality of features 154 of second region 152 is disposed between first member 156a and second member 156b. Further, in example embodiments, with light-blocking layer 144 disposed between top support plate 114 and diffusion layer 111, light-blocking portions 146 are arranged in a grid forming a second area 160. As shown in FIGS. 4 and 5, first light-blocking portion 146a is disposed on inner surface 142 and aligned with, e.g., contacts, a first member 156a of the plurality of members 156 and a second light-blocking portion 146b is disposed on inner surface 142 and aligned with, e.g., contacts, second member 156b of the plurality of members 156. In certain embodiments, as shown in FIG. 5, for example, color filter layer 138 includes a color filter portion 140, such as red color filter portion 140a, green color filter portion 140b, blue color filter portion 140c, or transparent (white) color filter portion 140d, disposed in second area 160 between first light-blocking portion 146a and second light-blocking portion 146b. In this embodiment, second region 152 is disposed on color filter portion 140. In an alternative embodiment, as shown in FIG. 4, each feature 154 extends into second area 160 between first light-blocking portion 146a and second light-blocking portion 146b to contact inner surface 142 of top support plate 114. Electrode layer 110 is positioned over bottom support plate 104 for creating, in conjunction with common electrode 112, a voltage differential between electrode layer 110 and common electrode 112 to cause displacement of first fluid 130, e.g., the oil, to expose at least a portion of reflective layer 116.

Referring again to FIG. 4, as described above, diffusion layer 111 is disposed between bottom support plate 104 and top support plate 114 to contact second fluid 132. Diffusion layer 111 includes first region 150 providing common electrode 112 associated with electrowetting pixel region 102. In example embodiments, electrowetting pixel region 102 includes a plurality of pixel wall portions 108 forming a perimeter of an active portion of electrowetting pixel region 102. Diffusion layer 111 further includes second region 152 positioned over the active portion of electrowetting pixel region 102. Second region 152 includes a plurality of features 154. Each feature 154 is separated by a distance from adjacent features 154 and has a second refractive index greater than the first refractive index.

Referring now to FIG. 5, in certain embodiments, color filter layer 138 includes a color filter portion 140 disposed in electrowetting pixel region 102 between top support plate 114 and diffusion layer 111. A light-blocking portion 146, e.g., first light-blocking portion 146a, is positioned along an edge 162 of color filter portion 140, such that first light-blocking portion 146a is positioned over, e.g., aligned with, first pixel wall portion 108a. As shown in FIG. 5, first region 150 is disposed on first light-blocking portion 146a and second region 152 is disposed on color filter portion 140. Reflective layer 116 is positioned over bottom support plate 104 within electrowetting pixel region 102. Electrode layer 110 is positioned over bottom support plate 104 and coupled to common electrode 112 for creating a voltage differential between electrode layer 110 and common electrode 112 to cause displacement of the first liquid to expose at least a portion of reflective layer 116.

Referring now to FIG. 6, in example embodiments, first region 150 includes a plurality of members 156 arranged, for example, in a plurality of parallel lines, e.g., a plurality of parallel horizontal lines or a plurality of parallel vertical lines, including one or more members 156 or in a first grid 164, to form common electrode 112. Members 156 at least partially form a perimeter of first area 158 and second region 152 is disposed in first area 158 such that members 156 of first region 150 at least partially form a perimeter of second region 152. Color filter layer 138 and light-blocking layer 144 are disposed between top support plate 114 and diffusion layer 111. Light-blocking layer 144 includes a plurality of light-blocking portions 146 arranged in a second grid 166 forming second area 160. More specifically, first light-blocking portion 146a of color filter layer 138 is disposed on first member 156a and positioned over first pixel wall portion 108a. As shown in FIGS. 4 and 5, first light-blocking portion 146a is aligned with first member 156a. In a particular embodiment, each feature 154 extends into second area 160 to contact inner surface 142 of top support plate 114, as shown in FIG. 4. In an alternative embodiment, color filter portion 140 of color filter layer 138 is disposed in second area 160, as shown in FIG. 5.

Referring further to FIG. 5, in certain embodiments, color filter layer 138 is disposed between top support plate 114 and diffusion layer 111. In these embodiments, color filter layer 138 includes a color filter portion 140 positioned in electrowetting pixel region 102. A light-blocking portion 146, e.g., first light-blocking portion 146a, of light-blocking layer 144 is positioned along edge 162 of color filter portion 140, such that first light-blocking portion 146a is positioned over, e.g., aligned with, first pixel wall portion 108a. As shown in FIG. 5, at least a portion of first region 150 is disposed on first light-blocking portion 146a and at least a portion of second region 152 is disposed on color filter portion 140.

Reflective layer 116 is positioned over bottom support plate 104 within electrowetting pixel region 102. Electrode layer 110 is positioned over bottom support plate 104 and coupled to common electrode 112 for creating a voltage differential between electrode layer 110 and common electrode 112 to cause displacement of the first liquid to expose at least a portion of reflective layer 116.

In the example embodiment, top support plate 114 has a first refractive index, diffusion layer 111 has a second refractive index greater than the first refractive index of top support plate 114, and second fluid 132 has a third refractive index less than the second refractive index. In certain embodiments, top support plate 114 comprises a material having the first refractive index of 1.4 to 1.6, and, in particular embodiments, a first refractive index of 1.5;

diffusion layer 111 comprises a material having the second refractive index equal to or greater than 1.5, and, in particular embodiments, between 1.5 to 2.5; and second fluid 132 has the third refractive index of 1.4 to 1.6, and, in particular embodiments, a third refractive index of 1.45. In certain embodiments, top support plate 114 comprises a material having the first refractive index of less than 2.0, diffusion layer 111 comprises a material having the second refractive index of at least 2.0, and second fluid 132 has the third refractive index of less than 2.0. For example, in the example embodiment, top support plate 114 is made of a glass material having the first refractive index of 1.5, diffusion layer 111 is made of an ITO material having the second refractive index of 2.0, and second fluid 132 has the third refractive index of 1.45. Further, in certain embodiments, second fluid 132 has the third refractive index equal to or substantially similar to the first refractive index.

In the example embodiment, diffusion layer 111 has a thickness of 0.1 micrometers to 2.0 micrometers and, more particularly, a thickness of about 100 nanometers to about 300 nanometers. In certain embodiments, diffusion layer 111 is patterned using a suitable patterning technique, such as described herein, to form a plurality of features 154. Each feature 154 is separated by a distance from adjacent features of the plurality of features. As shown in FIG. 4, features 154 are separated by voids 167 defined through diffusion layer 111. For example, in this embodiment, diffusion layer 111 includes a patterned indium tin oxide (ITO) material layer forming features 154 separated from adjacent features 154 by voids 167 defined through diffusion layer 111. The indium tin oxide (ITO) material layer forming diffusion layer 111 has the second refractive index of 2.0.

As described in greater detail below, in certain embodiments, features 154 can be placed randomly, e.g., without a predetermined pattern and/or predetermined distribution or density, on a glass top support plate 114, for example, to provide internal diffusion. Moreover, one or more parameters of the plurality of features 154 including, without limitation, a shape of each feature 154, one or more dimensions of each feature 154 in a plane of diffusion layer 111, and/or a distribution or a density of the plurality of features 154 within diffusion layer 111 are tuned to provide a predetermined diffusion characteristic of diffusion layer 111. In certain embodiments, for example, within each electrowetting pixel region 102, diffusion layer 111 has a distribution of features 154 greater than 10%, and, more particularly, greater than 70%, and, even more particularly, greater than 80%. In example embodiments, an average feature width is 5 micrometers to 20 micrometers and a density of features 154 in diffusion layer 111 is $5 \times 10^3$/millimeter (mm)$^2$ to $40 \times 10^3$/mm$^2$. Features 154 can be positioned either randomly or in order, e.g., patterned in a predetermined pattern, within diffusion layer 111. The average feature width and the distribution or density of features 154 in diffusion layer 111 may change depending on the application. As a result, a degree of light diffusion within the electrowetting pixel region, e.g., within electrowetting pixel region 102 or exiting electrowetting pixel region 102, a direction of light diffusion, and/or a transmittance of diffusion layer 111 can be controlled by tuning one or more parameters of features 154 and voids 167. For example, a shape of features 154, e.g., a circular, square, hexagonal or other suitable polygonal shape, one or more dimensions of features 154, e.g., a width and/or a length of feature 154 in a plane of diffusion layer 111, and/or a density of features 154 within diffusion layer 111 can be tuned to predicatively control the diffusion characteristics of diffusion layer 111.

Additionally or alternatively, a thickness of diffusion layer 111, e.g., a thickness of the ITO layer, a layout of features 154 in diffusion layer 111, e.g., a parallel, zigzag or chevron layout, and/or a pitch of a sidewall of features 154 can be tuned to predicatively control the diffusion characteristics of diffusion layer 111.

Reflective electrowetting display device 100 has a viewing side 168 corresponding to top support plate 114 through which an image formed by reflective electrowetting display device 100 may be viewed, and an opposing rear side 169 corresponding to bottom support plate 104 as shown, for example, in FIGS. 1 and 2. Reflective electrowetting display device 100 may be a segmented display type in which the image is built of segments. The segments may be switched simultaneously or separately. Each segment includes one electrowetting pixel region 102 or a number of electrowetting pixel regions 102 that may be neighboring or distant from one another. Electrowetting pixel regions 102 included in one segment are switched simultaneously, for example. Electrowetting display device 100 may also be an active matrix driven display type or a passive matrix driven display, for example.

Referring further to FIG. 4, with an electric potential applied to electrowetting pixel region 102 causing displacement of first fluid 130 disposed within electrowetting pixel region 102, light entering electrowetting display device 100 travels through electrowetting pixel region 102 and impinges upon reflective layer 116. More specifically, an example incident light ray, such as light ray 170, is refracted as it enters top support plate 114 and propagates through top support plate 114. At an interface of diffusion layer 111 with top support plate 114, light ray 170 is refracted again as it enters feature 154. Light ray 170 propagates through feature 154 and is refracted again as it propagates into second fluid 132 and impinges on reflective layer 116 at a single incoming angle or direction. Light ray 170 is reflected by a surface of reflective layer 116 in a single mirror-like outgoing angle or direction as an example light ray 172. Light ray 172 propagates through second fluid 132. As light ray 172 enters feature 154, it is refracted and propagates through feature 154 into top support plate 114, where it is refracted again. Light ray 172 propagates through top support plate 114 and, as light ray 172 exits top support plate 114, light ray 172 is refracted once more.

Desired optical performance, such as an optimization of brightness and diffusion characteristics of electrowetting display device 100, can be achieved through reflective layer and/or diffusion layer design. For example, adjusting a number and/or a configuration of features 154 within diffusion layer 111 can achieve such desired optical performance.

In one embodiment, an electrowetting display device includes a first or bottom support plate and an opposing second or top support plate. The second support plate has a first refractive index. An electrowetting pixel region, e.g., a sub-pixel, between the first support plate and the second support plate includes a plurality of pixel wall portions over the first support plate forming a perimeter of the electrowetting pixel region, e.g., a perimeter of an active portion of the electrowetting pixel region. A reflective layer is disposed over the first support plate within the electrowetting pixel region. An oil and an electrolyte liquid that is immiscible with the oil are disposed in the electrowetting pixel region. A light-absorbing layer is disposed on an inner surface of the second support plate. The light-blocking layer includes a plurality of light-blocking portions on the second support plate. A first light-blocking portion of the plurality of light-blocking portions is positioned over a first pixel wall portion of the plurality of pixel wall portions. A color filter layer is disposed on the inner surface of the second support plate coplanar with the light-blocking layer. The color filter layer includes a color filter portion in the electrowetting pixel region. A diffusion layer, e.g., an indium tin oxide (ITO) layer, includes a first region disposed on the light-blocking layer. The first region forms at least a portion of a common electrode associated with the electrowetting pixel region and contacting the electrolyte liquid. A second region of the ITO layer is disposed on the color filter layer over the electrowetting pixel region. The second region includes a plurality of features configured to diffuse light propagating through the ITO layer into the electrowetting pixel region. Each feature of the plurality of features has a second refractive index greater than the first refractive index and is separated by a distance from an adjacent feature of the plurality of features. An electrode layer is positioned over the first support plate for creating, in conjunction with the common electrode, a voltage differential between the electrode layer and the common electrode to cause displacement of the oil to expose at least a portion of the reflective layer. In a particular embodiment, the plurality of members are arranged to form the common electrode. The ITO layer in the first region includes a first member disposed on the first light-blocking portion and a second member disposed on a second light-blocking portion of the plurality of light-blocking portions. The second light-blocking portion is positioned over a second pixel wall portion of the plurality of pixel wall portions opposite the first pixel wall portion and the ITO layer in the second region includes a plurality of features disposed between the first member and the second member. In a further embodiment, the plurality of light-blocking portions forms a perimeter of the color filter portion. In a particular embodiment, the plurality of features in the second region is disposed on the color filter portion.

In one embodiment, a display device includes a first support plate and a second support plate. The second support plate has a first refractive index. A pixel region is disposed between the first support plate and the second support plate includes a plurality of pixel wall portions forming a perimeter of the pixel region. A first liquid and a second liquid that is immiscible with the first liquid are disposed in the pixel region. A diffusion layer is disposed between the first support plate and the second support plate and contacts the second liquid. In example embodiments, the diffusion layer includes a layer of electrically conductive indium tin oxide having a thickness of 100 nanometers to 300 nanometers and having the second refractive index of 2.0. The diffusion layer has a first region providing a common electrode associated with the pixel region. In certain embodiments, a second region of the diffusion layer is positioned over the pixel region, e.g., over an active portion of the pixel region. The second portion includes a plurality of features. Each feature of the plurality of features is separated by a distance from an adjacent feature of the plurality of features and has a second refractive index greater than the first refractive index. Each feature is also separated by a distance from the first region to electrically isolate the second region from the first region. In example embodiments, the pixel region includes a plurality of pixel wall portions forming a perimeter of the pixel region. The first region includes a first member positioned over a first pixel wall portion of the plurality of pixel wall portions. A second member is positioned over a second pixel wall portion of the plurality of pixel wall portions opposite the first pixel wall portion. The plurality of features is disposed between the first member and the second member. In a particular embodiment, a light-blocking layer is disposed between the second support plate and the diffusion layer. The light-blocking layer includes a plurality of light-blocking portions. A first light-blocking portion of the plurality of light-blocking portions is positioned on an inner surface of the second support and contacts the first member. A second light-blocking portion of the plurality of light-blocking portions is positioned on the inner surface and contacts the second member. In one embodiment, a color filter layer is disposed between the second support plate and the diffusion layer coplanar with the light-blocking layer. The color filter layer includes a color filter portion disposed between the first light-blocking portion and the second light-blocking portion. Alternatively, in embodiments not having a color filter layer, each feature may extend into an area between the first light-blocking portion and the second light-blocking portion to contact the inner surface of the second support plate. In example embodiments, a reflective layer is positioned over the first support plate within the pixel region. An electrode layer is positioned over the first support plate. The electrode layer is coupled to the common electrode for creating a voltage differential between the electrode layer and the common electrode to cause displacement of the oil to expose at least a portion of the reflective layer.

In example embodiments, the display device includes a color filter layer disposed between the second support plate and the diffusion layer. The color filter layer includes a color filter portion positioned in the pixel region. A light-blocking layer coplanar with the color filter layer includes a light-blocking portion positioned along an edge of the color filter portion. The light-blocking portion is positioned over a first pixel wall portion of a plurality of pixel wall portions forming a perimeter of the pixel region. In these embodiments, the first region is disposed on the light-blocking portion and the second region is disposed on the color filter portion. In certain embodiments, the first region includes a plurality of members forming at least a portion of the common electrode and arranged in a grid to form a perimeter of the second region. A color filter layer may be disposed between the second support plate and the diffusion layer. The color filter layer includes a plurality of light-blocking portions. A first member of the plurality of members is disposed on a first light-blocking portion of the plurality of light-blocking portions. The first light-blocking portion is positioned over a first pixel wall portion of a plurality of pixel wall portions forming a perimeter of the pixel region.

In a further embodiment, a display device includes a first support plate and a second support plate. The second support plate has a first refractive index. A pixel region is between the first support plate and the second support plate. A first liquid and a second liquid that is immiscible with the first liquid are disposed in the pixel region. An electrically conductive layer is disposed between the first support plate and the second support plate and contacts the second liquid. The electrically conductive layer includes a first region providing a common electrode associated with the pixel region. In example embodiments, the electrically conductive layer also includes a second region positioned in the pixel region. The second region includes a plurality of features. Each feature is separated by a distance from an adjacent feature and has a second refractive index greater than the first refractive index. In certain embodiments, the pixel region includes a plurality of pixel wall portions forming a perimeter of the pixel region. The first region includes a first member positioned over a first pixel wall portion of the plurality of pixel wall portions and a second member positioned over a second pixel wall portion of the plurality of pixel wall portions opposite the first pixel wall portion. The plurality of features is disposed between the first member and the second member. A light-blocking layer is disposed between the second support plate and the electrically conductive layer. The light-blocking layer includes a plurality of light-blocking portions. A first light-blocking portion is positioned on an inner surface of the second support and contacts the first member and a second light-blocking portion is positioned on the inner surface and contacts the second member. A color filter layer coplanar with the light-blocking layer includes a color filter portion disposed between the first light-blocking portion and the second light-blocking portion.

Figure 7:
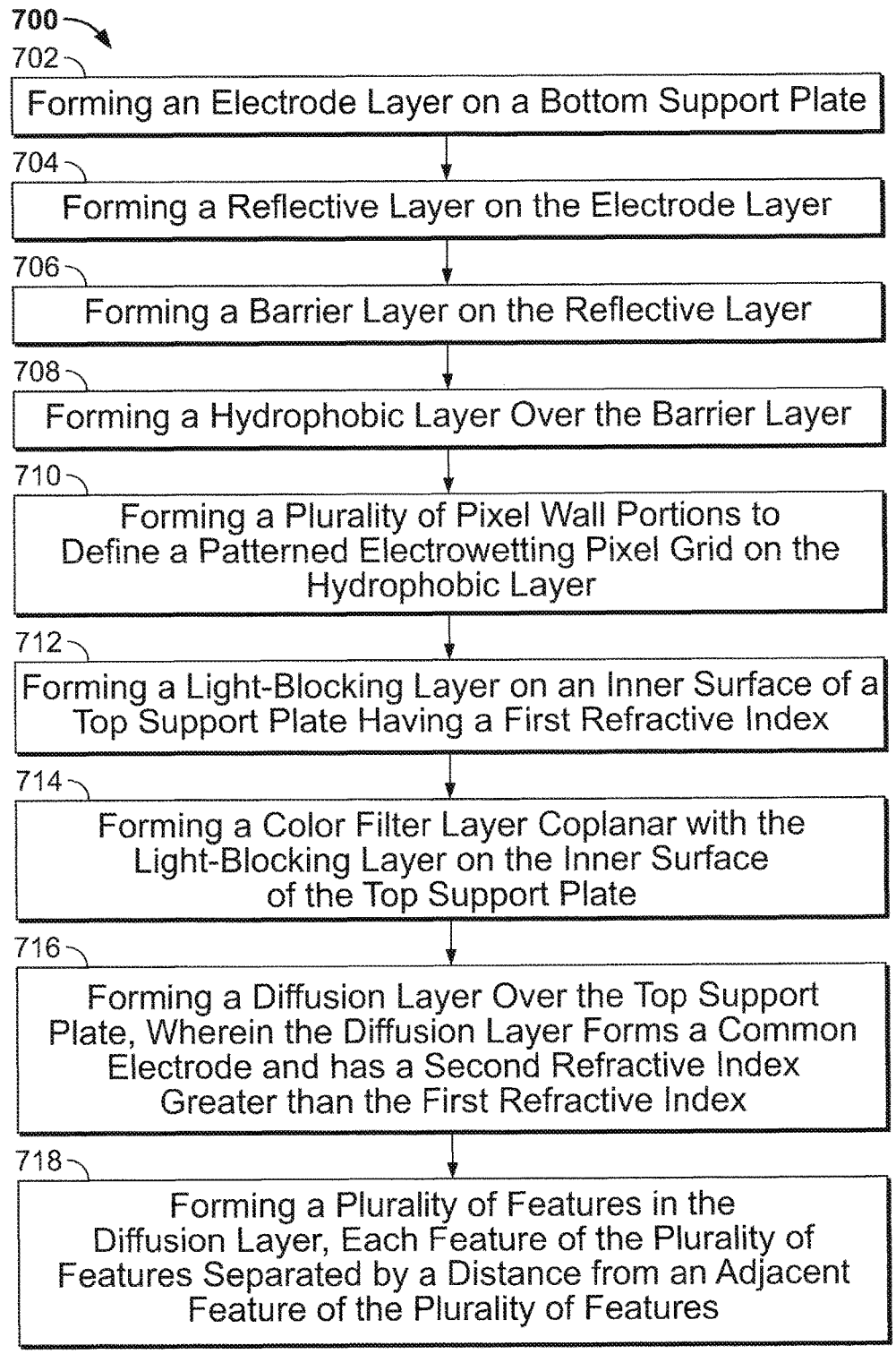
FIG. 7 illustrates an example method for fabricating an electrowetting display device, according to various embodiments.

FIG. 7 is a flow diagram of an example method 700 for fabricating an electrowetting display device, such as electrowetting display device 100 as shown in FIGS. 1-6. Though claimed subject matter is not limited in this respect, method 700 may be performed manually (e.g., by humans) and/or using automated equipment. At block 702, an electrode layer 110 is formed on first or bottom support plate 104. Additional layers may be positioned between electrode layer 110 and bottom support plate 104. In one embodiment, a multilayer stack including a first conductive layer is formed on bottom support plate 104. In this embodiment, the first conductive layer is indium tin oxide (ITO), although in alternative embodiments the first conductive layer may be another suitable material. Deposition techniques include, for example, chemical vapor deposition (CVD), physical vapor deposition (PVD), molecular beam epitaxy (MBE), and sputtering. The multilayer stack includes a first dielectric layer deposited on the first conductive layer. The first dielectric layer may comprise SiN, SiON, SiO, or TaO, for example. Any suitable deposition technique may be used, such as CVD, PVD, MBE, and sputtering, for example.

Reflective layer 116 is then formed 704 on electrode layer 110. In this embodiment, reflective layer 116 is positioned with respect to or within a respective display surface area 106 of each electrowetting pixel region 102. This process forms reflective layer 116 as shown in FIGS. 1, 2, 4 and 5. A suitable barrier layer 120 is formed 706 on reflective layer 116. A hydrophobic layer, such as an AF 1600® layer, (e.g., hydrophobic layer 122, shown in FIGS. 1 and 2) is formed 708 over barrier layer 120. At block 710, a plurality of pixel wall portions 108 are formed to define a patterned grid 101 on hydrophobic layer 122. In one embodiment, pixel wall portions 108 include a photoresist material such as, for example, epoxy-based negative photoresist SU-8. The formed patterned grid 101 includes a plurality of rows and a plurality of columns of coupled pixel wall portions 108 that form an array of electrowetting pixel regions 102, such as shown in FIG. 3, having a suitable width and length.

In one embodiment, a photoresist material is deposited over the multilayer stack and at block 710 the photoresist material is exposed to a photomask to form pixel wall portions 108. In alternative embodiments, these structures may be printed using suitable methods other than photolithography, including, without limitation, direct writing and electron beam lithography (EBL). The pixel wall portions 108 are cured and fused together and the uncured portions of the photoresist material are removed to leave pixel wall portions 108.

At block 712, a light-blocking layer 144 is disposed, e.g., formed or deposited, on or over a surface of a support plate having a first refractive index, such as inner surface 142 of top support plate 114. In example embodiments, at block 712, a plurality of light-blocking portions 146 is formed on inner surface 142. As shown in FIGS. 4 and 5, a first light-blocking portion 146a of the plurality of light-blocking portions 146 is positioned over, e.g., aligned with, a first pixel wall portion 108a of the plurality of pixel wall portions 108. The plurality of light-blocking portions 146 forms a perimeter of an associated second area 160. In particular embodiments, at block 714, a color filter layer 138 coplanar with light-blocking layer 144 is disposed, e.g., formed or deposited, on or over inner surface 142. More specifically, a color filter portion 140 is disposed in the associated second area 160 formed by light-blocking portions 146. As shown in FIG. 6, for example, in certain embodiments, light-blocking portions 146 are arranged in second grid 166 over inner surface 142 of top support plate 114 and associated with a plurality of electrowetting pixel regions 102 of electrowetting display device 100. In these embodiments, light-blocking portions 146 form a perimeter of a plurality of second areas 160. In certain embodiments, as shown in FIG. 5, for example, color filter layer 138 includes a color filter portion 140, such as red color filter portion 140a, green color filter portion 140b, blue color filter portion 140c, or transparent (white) color filter portion 140d, disposed in associated second area 160.

In an example embodiment, at block 712, light-blocking layer 144 is patterned using a first photomask to form a plurality of light-blocking portions 146 arranged in second grid 166 and defining a perimeter of associated second areas 160. In one embodiment, a photoresist material is deposited on top support plate 114 and the photoresist material is exposed to the first photomask to form interconnected light-blocking portions 146. In alternative embodiments, light-blocking portions 146 may be printed using suitable methods other than photolithography, including, without limitation, direct writing and electron beam lithography (EBL). Light-blocking portions 146 are cured and the uncured portions of the photoresist material are removed to leave second grid 166 of light-blocking portions 146.

At block 714, color filter layer 138 is then patterned using a second photomask to form color filter portion 140, e.g., red color filter portion 140a, green color filter portion 140b, blue color filter portion 140c, or transparent (white) color filter portion 140d, within each associated second area 160. In alternative embodiments, color filter portions 140 may be printed using suitable methods other than photolithography, including, without limitation, direct writing and electron beam lithography (EBL). Color filter portions 140 are cured and the uncured portions of the photoresist material are removed to leave color filter portions 140 disposed within second grid 166 of light-blocking portions 146.

At block 716, a diffusion layer 111 is disposed, e.g., formed or deposited, on or over the support plate, e.g., top support plate 114. In one embodiment, a planarization layer 145 is disposed on, e.g., formed or deposited on, light-blocking layer 144 and color filter layer 138 before diffusion layer 111 is disposed over the support plate. In example embodiments, diffusion layer 111 provides common electrode 112 of the electrowetting display device. In this embodiment, diffusion layer 111 has a second refractive index greater than the first refractive index of top support plate 114. For example, diffusion layer 111 may be formed of ITO having a refractive index of 2.0. In an example embodiment, at block 716, first region 150 of diffusion layer 111 is formed over top support plate 114. First region 150 includes a plurality of members 156 arranged to form at least a portion of common electrode 112 over inner surface 142 of top support plate 114 and associated with a plurality of electrowetting pixel regions 102 of electrowetting display device 100. In this embodiment, the plurality of members 156 forms a perimeter of an associated first area 158. In an example embodiment, at block 716, diffusion layer 111 is patterned using a photomask to form a plurality of members 156 at least partially defining a perimeter of associated first areas 158. In one embodiment, a photoresist material is deposited on top support plate 114 and the photoresist material is exposed to the photomask to form interconnected members 156. In alternative embodiments, members 156 may be printed using suitable methods other than photolithography, including, without limitation, direct writing and electron beam lithography (EBL). Members 156 are cured and the uncured portions of the photoresist material are removed to leave first grid 164 of members 156.

A plurality of features is formed 718 in diffusion layer 111. At step 718, in certain example embodiments, second region 152 is formed in first area 158. Second region 152 includes a plurality of features 154. Each feature 154 of the plurality of features is separated by a distance from an adjacent feature 154 and has a second refractive index greater than the first refractive index. The plurality of features are distributed, either randomly or in order, e.g., patterned in a predetermined pattern, within the diffusion layer to form the diffusion layer having a distribution of features greater than 70%.

In one embodiment, diffusion layer 111 includes a suitable photoresist material. In example embodiments, the photoresist material has a relatively high refractive index. Suitable photoresist materials can be formed by hybrid techniques. For example, an organic base polymer, such as an acrylate, epoxy or polyimide polymer, can be combined with inorganic nanoparticles with a high refractive index. Suitable materials for the high refractive index nanoparticles include, without limitation, Si3N4 (n=2.03), Ta2O5 (n=2.07), TiO2 (n=2.3), SnO2 (n=1.90), and ZrO2 (n=2.10). In certain embodiments, the base polymer can be tuned in order to prevent aggregation of the nanoparticles in the polymer network. In order to maintain the transparency of the base polymer, the nanoparticles have a diameter of 25 nanometers or less, in certain embodiments.

The formed patterned features 154 have a suitable shape and density. The photoresist material is deposited over top support plate 114 and at block 718 the photoresist material is exposed to a diffractive dark field mask and patterned to form a plurality of features 154 separated by voids 167 extending through a thickness of diffusion layer 111. Features 154 are cured and the uncured portions of the photoresist material are removed to leave features 154 and voids 167 extending through a thickness of diffusion layer 111. For example, at block 718, diffusion layer 111 is patterned to define a predetermined pattern of features 154 separated by voids 167 on top support plate 114. In certain embodiments, forming a plurality of features, e.g., patterning the diffusion layer using a diffractive mask to form a plurality of features separated by voids defined through the diffusion layer, includes tuning one or more parameters of the plurality of features to control at least one of the following: a degree of light diffusion, a direction of light diffusion, and a transmittance of an internal diffuser. Further, forming a plurality of features, e.g., patterning the diffusion layer using a diffractive mask to form a plurality of features separated by voids defined through the diffusion layer, may include tuning one or more of the following parameters of the plurality of features to provide a predetermined diffusion characteristic of the diffusion layer: a shape of each feature, one or more dimensions of each feature in a plane of the diffusion layer, and a density of the plurality of features within the diffusion layer. In alternative embodiments, these structures may be printed using suitable methods other than photolithography, including, without limitation, direct writing and electron beam lithography (EBL).

Figure 8:
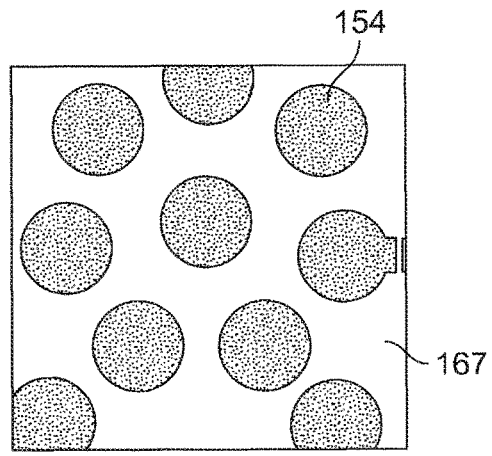
FIG. 8 illustrates an example patterned diffusion layer of an example electrowetting display device, according to various embodiments.
Figure 9:
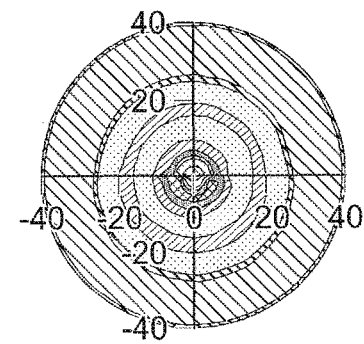
FIG. 9 illustrates a corresponding diffusion pattern for the patterned diffusion layer of FIG. 8.
Figure 10:
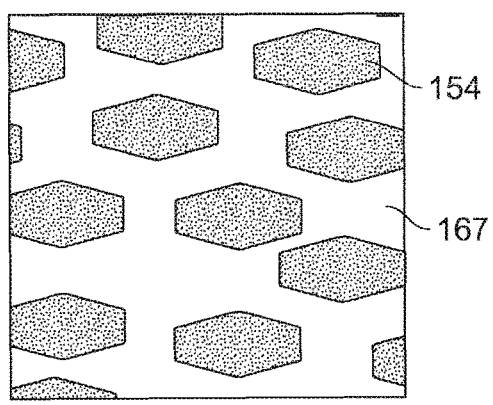
FIG. 10 illustrates an example patterned diffusion layer of an example electrowetting display, according to various embodiments.
Figure 11:
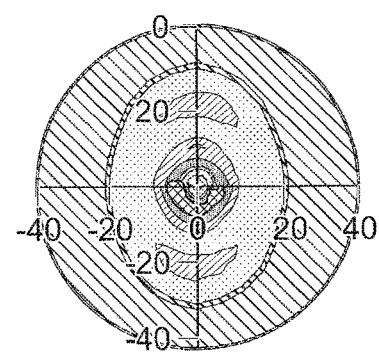
FIG. 11 illustrates a corresponding diffusion pattern for the patterned diffusion layer of FIG. 10.
Figure 12:
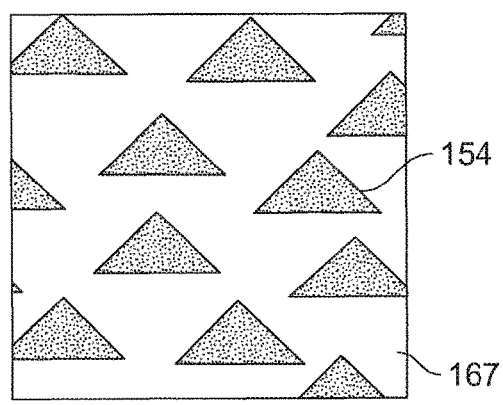
FIG. 12 illustrates an example patterned diffusion layer of an example electrowetting display device, according to various embodiments.
Figure 13:
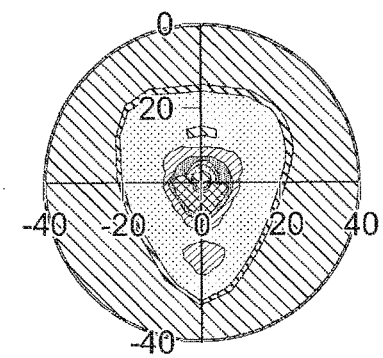
FIG. 13 illustrates a corresponding diffusion pattern for the patterned diffusion layer of FIG. 12.
Figure 14A:
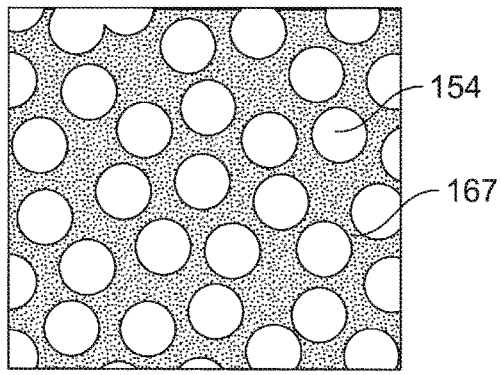
FIGS. 14A-16B illustrate suitable patterns for an ITO layer forming a diffusion layer of an example electrowetting display device, according to various embodiments.
Figure 14B:
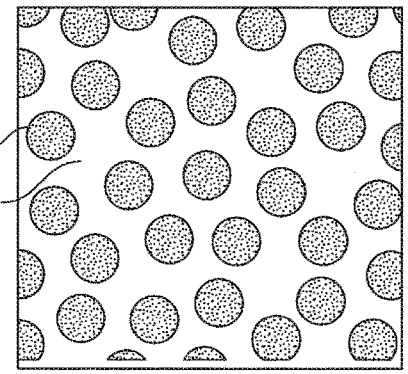
Figure 15A:
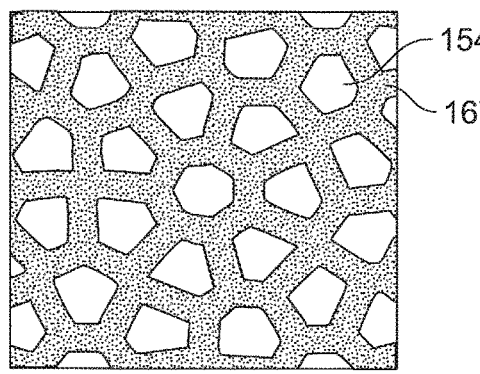
Figure 15B:
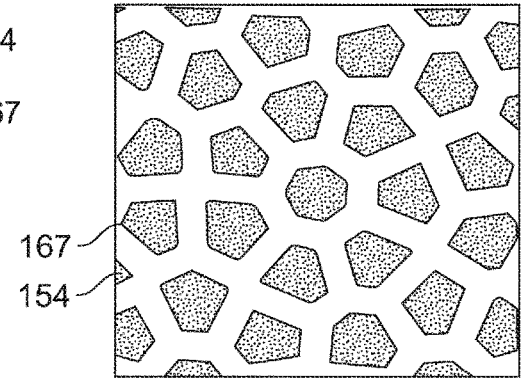

Referring to FIGS. 8-13, in certain embodiments, within a restriction of a minimum size, e.g., 3 micrometers, for features 154 of diffusion layer 111, features 154 can be placed randomly over top support plate 114 to provide internal diffusion. Referring further to FIGS. 8-13, the degree of light diffusion, a direction of light diffusion, and/or a transmittance of an internal diffuser can be controlled by tuning one or more parameters while patterning diffusion layer 111 to form features 154 and voids 167. As shown in FIGS. 8, 10, and 12, a shape of features 154, e.g., a circular, square, hexagonal or other suitable polygonal shape, one or more dimensions of features 154, e.g., a width and/or a length of feature 154 in a plane of diffusion layer 111, and/or a density of features 154 within diffusion layer 111 can be tuned to predicatively control the diffusion characteristics of diffusion layer 111. For example, features 154 having a circular cross-sectional shape, as shown in FIG. 8, will have a corresponding diffusion pattern as shown in FIG. 9. Similarly, features 154 having an oval cross-sectional shape, as shown in FIG. 10, will have a corresponding diffusion pattern as shown in FIG. 11 and features 154 having a triangular cross-sectional shape, as shown in FIG. 12, will have a corresponding diffusion pattern as shown in FIG. 13.

Figure 16A:
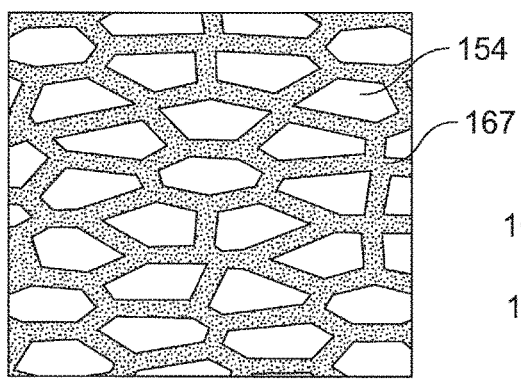
Figure 16B:
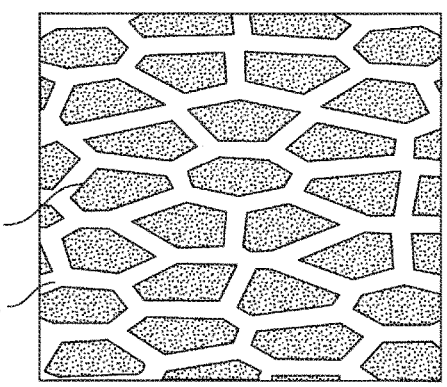

FIGS. 14A-16B show suitable patterns for an ITO layer forming diffusion layer 111 to provide desired diffusion characteristics within electrowetting display device 100. Within each electrowetting pixel region 102, a distribution of features 154 in diffusion layer 111 may be random, ordered, e.g., patterned, or a combination of random and ordered. Moreover, a portion of electrowetting pixel region 102 at which first fluid 130 is displaced, such as shown in FIGS. 2 and 4, may not include any features 154. For example, in FIGS. 14A, 15A, and 16A, the patterned features 154 of diffusion layer 111 are shown in white. Depending on the requirements for diffusiveness, a reverse pattern, as shown in FIGS. 14B, 15B, and 16B, can be applied having interconnected features 154 with voids 167.

First fluid 130 and second fluid 132 (e.g., the oil and the electrolyte solution) can be disposed within electrowetting pixel regions 102 of electrowetting display device 100. Top support plate 114 is then coupled to bottom support plate 104 to fabricate electrowetting display device 100. As shown in FIGS. 1 and 2 for example, top support plate 114 is opposite bottom support plate 104, forming opposing outer surfaces of electrowetting display device 100.

In one embodiment, a method for fabricating an electrowetting display device includes forming a diffusion layer between a first support plate and a second support plate. The diffusion layer contacts a liquid electrolyte solution within a plurality of pixel regions between the first support plate and the second support plate to provide a common electrode associated with the plurality of pixel regions. In a particular embodiment, forming a diffusion layer between a first support plate and a second support plate includes forming a first region over the second support plate having a first refractive index. The first region includes a plurality of members arranged in a grid forming at least a portion of the common electrode over an inner surface of the second support plate. The plurality of members form a perimeter of a first area. A second region is formed in the first area. The second region includes a plurality of features. Each feature of the plurality of features is separated by a distance from an adjacent feature of the plurality of features and has a second refractive index greater than the first refractive index. In one embodiment, a plurality of light-blocking portions is formed between the second support plate and the diffusion layer such that a first light-blocking portion of the plurality of light-blocking portions is disposed on a first member of the plurality of members. The plurality of light-blocking portions forms a perimeter of a second area. In a particular embodiment, a color filter portion is disposed in the second area between the support plate and the second region.

In a certain embodiment, an electrode layer is formed on a second support plate, e.g., a bottom support plate, opposing the first support plate. A reflective layer is positioned over, e.g., deposited on, the electrode layer. A plurality of pixel wall portions is formed over the reflective layer. The plurality of pixel wall portions is associated with a plurality of electrowetting pixel regions. In this embodiment, the reflective layer is positioned with respect to or within a respective display surface area of each electrowetting pixel region of the plurality of electrowetting pixel regions.

Figure 17:
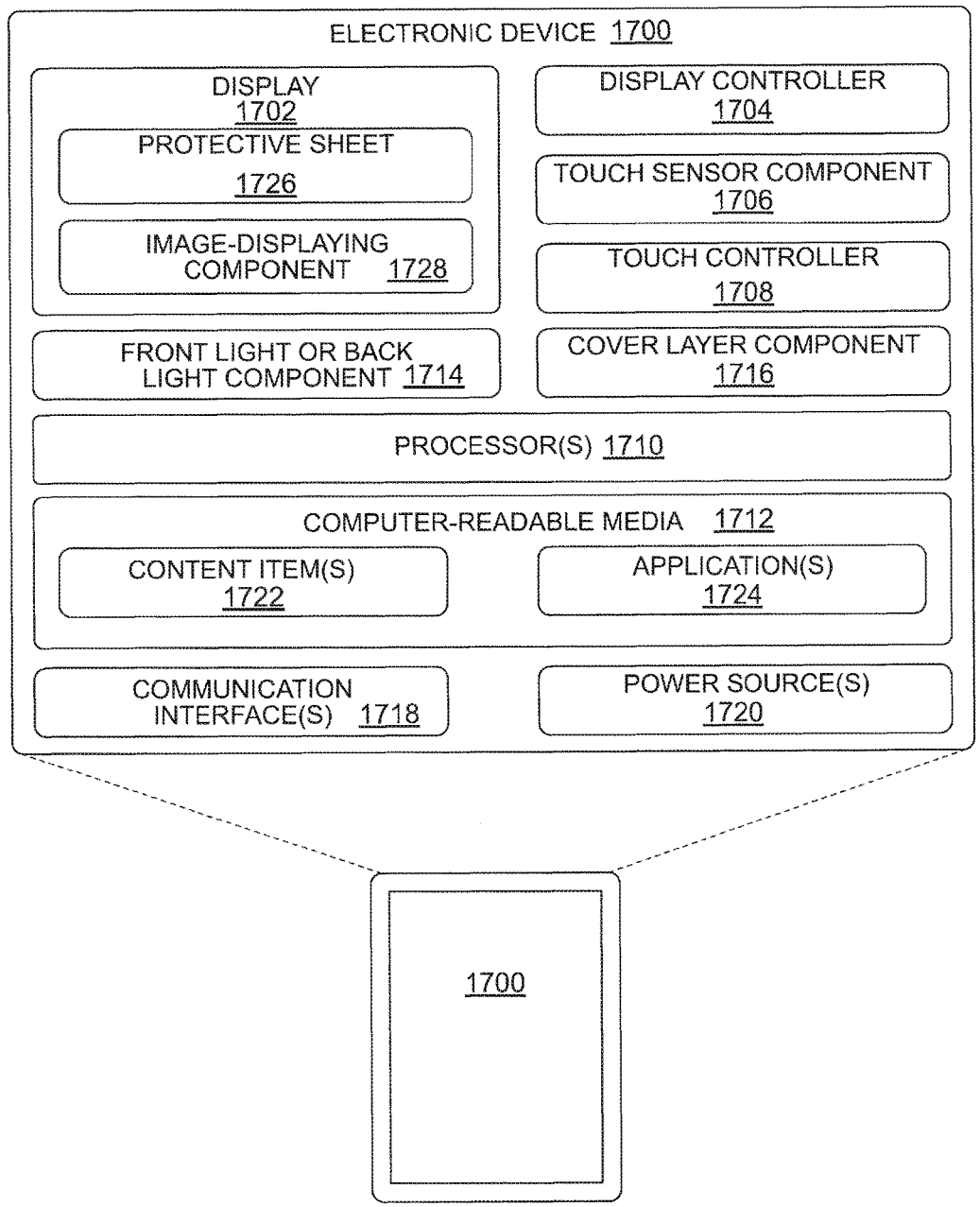
FIG. 17 illustrates an example electronic device that may incorporate an electrowetting display device, according to various embodiments.

FIG. 17 illustrates an example electronic device 1700 that may incorporate any of the display devices discussed above. Electronic device 1700 may comprise any type of electronic device having a display. For instance, electronic device 1700 may be a mobile electronic device (e.g., an electronic book reader, a tablet computing device, a laptop computer, a smart phone or other multifunction communication device, a portable digital assistant, a wearable computing device, or an automotive display). Alternatively, electronic device 1700 may be a non-mobile electronic device (e.g., a computer display or a television). In addition, while FIG. 17 illustrates several example components of electronic device 1700, it is to be appreciated that electronic device 1700 may also include other conventional components, such as an operating system, system busses, input/output components, and the like. Further, in other embodiments, such as in the case of a television or computer monitor, electronic device 1700 may only include a subset of the components illustrated.

Regardless of the specific implementation of electronic device 1700, electronic device 1700 includes a display 1702 and a corresponding display controller 1704. Display 1702 may represent a reflective or transmissive display in some instances or, alternatively, a transflective display (partially transmissive and partially reflective).

In one embodiment, display 1702 comprises an electrowetting display that employs an applied voltage to change the surface tension of a fluid in relation to a surface. For example, such an electrowetting display may include the array of electrowetting pixel regions 102 illustrated in FIG. 3, though claimed subject matter is not limited in this respect. By applying a voltage across a portion of an electrowetting pixel region of an electrowetting display, wetting properties of a surface may be modified so that the surface becomes increasingly hydrophilic. As one example of an electrowetting display, the modification of the surface tension acts as an optical switch by displacing a colored oil film if a voltage is applied to individual pixel regions of the display. If the voltage is absent, the colored oil forms a continuous film within a pixel region, and the color may thus be visible to a user. On the other hand, if the voltage is applied to the pixel region, the colored oil is displaced and the pixel region becomes transparent. If multiple pixel regions of display 1702 are independently activated, display 1702 may present a color or grayscale image. The pixel regions may form the basis for a transmissive, reflective, or transmissive/reflective (transreflective) display. Further, the pixel regions may be responsive to high switching speeds (e.g., on the order of several milliseconds), while employing small pixel dimensions. Accordingly, the electrowetting displays herein may be suitable for applications such as displaying video or other animated content.

Of course, while several different examples have been given, it is to be appreciated that while some of the examples described above are discussed as rendering black, white, and varying shades of gray, it is to be appreciated that the described techniques apply equally to reflective displays capable of rendering color pixel regions. As such, the terms "white," "gray," and "black" may refer to varying degrees of color in implementations utilizing color displays. For instance, where a pixel region includes a red color filter, a "gray" value of the pixel region may correspond to a shade of pink while a "black" value of the pixel region may correspond to a darkest red of the color filter. Furthermore, while some examples herein are described in the environment of a reflective display, in other examples, display 1702 may represent a backlit display, examples of which are mentioned above.

In addition to including display 1702, FIG. 17 illustrates that some examples of electronic device 1700 may include a touch sensor component 1706 and a touch controller 1708. In some instances, at least one touch sensor component 1706 resides with, or is stacked on, display 1702 to form a touch-sensitive display. Thus, display 1702 may be capable of both accepting user touch input and rendering content in response to or corresponding to the touch input. As several examples, touch sensor component 1706 may comprise a capacitive touch sensor, a force sensitive resistance (FSR), an interpolating force sensitive resistance (IFSR) sensor, or any other type of touch sensor. In some instances, touch sensor component 1706 is capable of detecting touches as well as determining an amount of pressure or force of these touches.

FIG. 17 further illustrates that electronic device 1700 may include one or more processors 1710 and one or more computer-readable media 1712, as well as a front light component 1714 (which may alternatively be a backlight component in the case of a backlit display) for lighting display 1702, a cover layer component 1716, such as a cover glass or cover sheet, one or more communication interfaces 1718 and one or more power sources 1720. The communication interfaces 1718 may support both wired and wireless connection to various networks, such as cellular networks, radio, WiFi networks, short range networks (e.g., Bluetooth®), and infrared (IR) networks, for example.

Depending on the configuration of electronic device 1700, computer-readable media 1712 (and other computer-readable media described throughout) is an example of computer storage media and may include volatile and nonvolatile memory. Thus, computer-readable media 1712 may include, without limitation, RAM, ROM, EEPROM, flash memory, and/or other memory technology, and/or any other suitable medium that may be used to store computer-readable instructions, programs, applications, media items, and/or data which may be accessed by electronic device 1700.

Computer-readable media 1712 may be used to store any number of functional components that are executable on processor 1710, as well as content items 1722 and applications 1724. Thus, computer-readable media 1712 may include an operating system and a storage database to store one or more content items 1722, such as eBooks, audio books, songs, videos, still images, and the like. Computer-readable media 1712 of electronic device 1700 may also store one or more content presentation applications to render content items on electronic device 1700. These content presentation applications may be implemented as various applications 1724 depending upon content items 1722. For instance, the content presentation application may be an electronic book reader application for rending textual electronic books, an audio player for playing audio books or songs, or a video player for playing video.

In some instances, electronic device 1700 may couple to a cover (not illustrated in FIG. 17) to protect the display 1702 (and other components in the display stack or display assembly) of electronic device 1700. In one example, the cover may include a back flap that covers a back portion of electronic device 1700 and a front flap that covers display 1702 and the other components in the stack. Electronic device 1700 and/or the cover may include a sensor (e.g., a Hall effect sensor) to detect whether the cover is open (i.e., if the front flap is not atop display 1702 and other components). The sensor may send a signal to front light component 1714 if the cover is open and, in response, front light component 1714 may illuminate display 1702. If the cover is closed, meanwhile, front light component 1714 may receive a signal indicating that the cover has closed and, in response, front light component 1714 may turn off.

Furthermore, the amount of light emitted by front light component 1714 may vary. For instance, upon a user opening the cover, the light from the front light may gradually increase to its full illumination. In some instances, electronic device 1700 includes an ambient light sensor (not illustrated in FIG. 17) and the amount of illumination of front light component 1714 may be based at least in part on the amount of ambient light detected by the ambient light sensor. For example, front light component 1714 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of display 1702 may vary depending on whether front light component 1714 is on or off, or based on the amount of light provided by front light component 1714. For instance, electronic device 1700 may implement a larger default font or a greater contrast when the light is off compared to when the light is on. In some embodiments, electronic device 1700 maintains, if the light is on, a contrast ratio for display 1702 that is within a certain defined percentage of the contrast ratio if the light is off.

As described above, touch sensor component 1706 may comprise a capacitive touch sensor that resides atop display 1702. In some examples, touch sensor component 1706 may be formed on or integrated with cover layer component 1716. In other examples, touch sensor component 1706 may be a separate component in the stack of the display assembly. Front light component 1714 may reside atop or below touch sensor component 1706. In some instances, either touch sensor component 1706 or front light component 1714 is coupled to a top surface of a protective sheet 1726 of display 1702. As one example, front light component 1714 may include a lightguide sheet and a light source (not illustrated in FIG. 17). The lightguide sheet may comprise a substrate (e.g., a transparent thermoplastic such as PMMA or other acrylic), a layer of lacquer and multiple grating elements formed in the layer of lacquer that function to propagate light from the light source towards display 1702; thus, illuminating display 1702.

Cover layer component 1716 may include a transparent substrate or sheet having an outer layer that functions to reduce at least one of glare or reflection of ambient light incident on electronic device 1700. In some instances, cover layer component 1716 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a $3h$ pencil). Without such scratch resistance, a device may be more easily scratched and a user may perceive the scratches from the light that is dispersed over the top of the reflective display. In some examples, protective sheet 1726 may include a similar UV-cured hard coating on the outer surface. Cover layer component 1716 may couple to another component or to protective sheet 1726 of display 1702. Cover layer component 1716 may, in some instances, also include a UV filter, a UV-absorbing dye, or the like, for protecting components lower in the stack from UV light incident on electronic device 1700. In still other examples, cover layer component 1716 may include a sheet of high-strength glass having an antiglare and/or antireflective coating.

Display 1702 includes protective sheet 1726 overlying an image-displaying component 1728. For example, display 1702 may be preassembled to have protective sheet 1726 as an outer surface on the upper or image-viewing side of display 1702. Accordingly, protective sheet 1726 may be integral with and may overlay image-displaying component 1728. Protective sheet 1726 may be optically transparent to enable a user to view, through protective sheet 1726, an image presented on image-displaying component 1728 of display 1702.

In some examples, protective sheet 1726 may be a transparent polymer film in the range of 25 to 200 micrometers in thickness. As several examples, protective sheet 1726 may be a transparent polyester, such as polyethylene terephthalate (PET) or polyethylene naphthalate (PEN), or other suitable transparent polymer film or sheet, such as a polycarbonate or an acrylic. In some examples, the outer surface of protective sheet 1726 may include a coating, such as the hard coating described above. For instance, the hard coating may be applied to the outer surface of protective sheet 1726 before or after assembly of protective sheet 1726 with image-displaying component 1728 of display 1702. In some examples, the hard coating may include a photoinitiator or other reactive species in its composition, such as for curing the hard coating on protective sheet 1726. Furthermore, in some examples, protective sheet 1726 may be dyed with a UV-light-absorbing dye, or may be treated with other UV-absorbing treatment. For example, protective sheet 1726 may be treated to have a specified UV cutoff such that UV light below a cutoff or threshold wavelength is at least partially absorbed by protective sheet 1726, thereby protecting image-displaying component 1728 from UV light.

According to some embodiments herein, one or more of the components discussed above may be coupled to display 1702 using fluid optically-clear adhesive (LOCA). For example, the light guide portion of front light component 1714 may be coupled to display 1702 by placing LOCA on the outer or upper surface of protective sheet 1726. If the LOCA reaches the corner(s) and/or at least a portion of the perimeter of protective sheet 1726, UV-curing may be performed on the LOCA at the corners and/or the portion of the perimeter. Thereafter, the remaining LOCA may be UV-cured and front light component 1714 may be coupled to the LOCA. By first curing the corner(s) and/or the perimeter, the techniques effectively create a barrier for the remaining LOCA and also prevent the formation of air gaps in the LOCA layer, thereby increasing the efficacy of front light component 1714. In other embodiments, the LOCA may be placed near a center of protective sheet 1726, and pressed outwards towards a perimeter of the top surface of protective sheet 1726 by placing front light component 1714 on top of the LOCA. The LOCA may then be cured by directing UV light through front light component 1714. As discussed above, and as discussed additionally below, various techniques, such as surface treatment of the protective sheet, may be used to prevent discoloration of the LOCA and/or protective sheet 1726.

While FIG. 17 illustrates a few example components, electronic device 1700 may have additional features or functionality. For example, electronic device 1700 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within electronic device 1700 may reside remotely from electronic device 1700 in some implementations. In these implementations, electronic device 1700 may utilize communication interfaces 1718 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting display device, comprising:
a first support plate and a second support plate, the second support plate having a first refractive index;
an electrowetting sub-pixel between the first support plate and the second support plate, the electrowetting sub-pixel including a plurality of pixel wall portions over the first support plate forming a perimeter of the electrowetting sub-pixel;
a reflective layer disposed over the first support plate;
an oil and an electrolyte solution that is immiscible with the oil, the oil and the electrolyte solution disposed in the electrowetting sub-pixel;
a light-blocking layer disposed on an inner surface of the second support plate, the light-blocking layer comprising a plurality of light-blocking portions, a first light-blocking portion of the plurality of light-blocking portions positioned over a first pixel wall portion of the plurality of pixel wall portions;
a color filter layer disposed on the inner surface of the second support plate, the color filter layer being coplanar with the light-blocking layer and comprising a color filter portion;
an indium tin oxide (ITO) layer comprising:
a first region disposed on the light-blocking layer, the first region forming at least a portion of a common electrode associated with the electrowetting sub-pixel and contacting the electrolyte solution; and
a second region disposed on the color filter layer, the second region including a plurality of features configured to diffuse light propagating through the ITO layer into the electrowetting sub-pixel, each feature of the plurality of features having a second refractive index greater than the first refractive index and each feature of the plurality of features being separated by a distance from an adjacent feature of the plurality of features; and
an electrode layer positioned over the first support plate for creating, in conjunction with the common electrode, a voltage differential between the electrode layer and the common electrode to cause displacement of the oil to expose at least a portion of the reflective layer.

2. The electrowetting display device of claim 1, wherein the first region of the ITO layer comprises a first member disposed on the first light-blocking portion and a second member disposed on a second light-blocking portion of the plurality of light-blocking portions, the second light-blocking portion positioned over a second pixel wall portion of the plurality of pixel wall portions opposite the first pixel wall portion, and the second region of the ITO layer comprises a plurality of features disposed between the first member and the second member.

3. The electrowetting display device of claim 1, wherein the plurality of light-blocking portions forms a perimeter of the color filter portion.

4. The electrowetting device of claim 1, wherein the plurality of features in the second region is disposed on the color filter portion.

5. A display device, comprising:
a first support plate and a second support plate, the second support plate having a first refractive index;
a pixel region between the first support plate and the second support plate;
a first liquid and a second liquid that is immiscible with the first liquid, the first liquid and the second liquid disposed in the pixel region; and
a diffusion layer disposed between the first support plate and the second support plate and contacting the second liquid, the diffusion layer including:
a first region providing a common electrode associated with the pixel region; and
a second region positioned adjacent the first region in the pixel region, the second region including a plurality of features, each feature of the plurality of features being separated by a distance from an adjacent feature of the plurality of features and having a second refractive index greater than the first refractive index.

6. The display device of claim 5, further comprising:
a reflective layer positioned over the first support plate; and
an electrode layer positioned over the first support plate, the electrode layer coupled to the common electrode for creating a voltage differential between the electrode layer and the common electrode to cause displacement of the first liquid to expose at least a portion of the reflective layer.

7. The display device of claim 5, wherein the pixel region includes a plurality of pixel wall portions forming a perimeter of the pixel region, the first region comprises:
a first member positioned over and separated by a distance from a first pixel wall portion of the plurality of pixel wall portions; and
a second member positioned over and separated by a distance from a second pixel wall portion of the plurality of pixel wall portions opposite the first pixel wall portion, wherein the plurality of features is disposed between the first member and the second member.

8. The display device of claim 7, further comprising a light-blocking layer disposed between the second support plate and the diffusion layer, the light-blocking layer comprising a plurality of light-blocking portions, a first light-blocking portion of the plurality of light-blocking portions positioned on an inner surface of the second support and contacting the first member and a second light-blocking portion of the plurality of light-blocking portions positioned on the inner surface and contacting the second member.

9. The display device of claim 8, further comprising a color filter layer coplanar with the light-blocking layer, the color filter layer comprising a color filter portion disposed between the first light-blocking portion and the second light-blocking portion.

10. The display device of claim 8, wherein each feature extends into an area between the first light-blocking portion and the second light-blocking portion to contact the inner surface of the second support plate.

11. The display device of claim 5, further comprising:
a color filter layer disposed between the second support plate and the diffusion layer, the color filter layer comprising a color filter portion; and
a light-blocking layer coplanar with the color filter layer, the light-blocking layer comprising a light-blocking portion positioned along an edge of the color filter portion, the light-blocking portion positioned over a first pixel wall portion partially forming a perimeter of the pixel region,
wherein the first region is disposed on the light-blocking portion and the second region is disposed on the color filter portion.

12. The display device of claim 5, wherein the first region comprises a plurality of members forming a perimeter of the second region, the display device further comprising a light-blocking layer disposed between the second support plate and the diffusion layer, the light-blocking layer comprising a first light-blocking portion disposed on a first member of the plurality of members, and the first member positioned over and separated by a distance from a first pixel wall portion partially forming a perimeter of the pixel region.

13. The display device of claim 5, wherein the second region comprises indium tin oxide having a thickness of 100 nanometers to 300 nanometers.

14. The display device of claim 5, wherein the second region comprises indium tin oxide having the second refractive index greater than 1.8.

15. A display device, comprising:
a first support plate and a second support plate, the second support plate having a first refractive index;
a pixel region between the first support plate and the second support plate;
a first liquid and a second liquid that is immiscible with the first liquid, the first liquid and the second liquid in the pixel region; and
an electrically conductive layer disposed between the first support plate and the second support plate and contacting the second liquid, the electrically conductive layer including:
a first region providing a common electrode associated with the pixel region; and
a second region positioned in the pixel region, the second region including a plurality of features, each feature of the plurality of features being separated by a distance from an adjacent feature of the plurality of features and having a second refractive index greater than the first refractive index.

16. The display device of claim 15, wherein the pixel region includes a plurality of pixel wall portions forming a perimeter of the pixel region, the first region comprises:
a first member positioned over and separated by a distance from a first pixel wall portion of the plurality of pixel wall portions; and
a second member positioned over and separated by a distance from a second pixel wall portion of the plurality of pixel wall portions opposite the first pixel wall portion,
wherein the plurality of features is disposed between the first member and the second member.

17. The display device of claim 16, further comprising a light-blocking layer disposed between the second support plate and the electrically conductive layer, the light-blocking layer comprising a plurality of light-blocking portions, a first light-blocking portion of the plurality of light-blocking portions positioned on an inner surface of the second support and contacting the first member and a second light-blocking portion of the plurality of light-blocking portions positioned on the inner surface and contacting the second member.

18. The display device of claim 17, further comprising a color filter layer coplanar with the light-blocking layer, the color filter layer comprising a color filter portion disposed between the first light-blocking portion and the second light-blocking portion.

\* \* \* \* \*